United States Patent
Gotoh et al.

(10) Patent No.: US 7,518,755 B2
(45) Date of Patent: Apr. 14, 2009

(54) IMAGE PROCESSING APPARATUS, IMAGE FORMING APPARATUS, METHOD FOR PROCESSING IMAGE, COMPUTER PROGRAM, AND RECORDING MEDIUM

(75) Inventors: Makio Gotoh, Nara (JP); Kazuhisa Kubota, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 555 days.

(21) Appl. No.: 11/253,439

(22) Filed: Oct. 18, 2005

(65) Prior Publication Data

US 2006/0082831 A1    Apr. 20, 2006

(30) Foreign Application Priority Data

Oct. 18, 2004    (JP)    ............... 2004-303485

(51) Int. Cl.
 H04N 1/405 (2006.01)
 H04N 1/60 (2006.01)
 G06K 9/46 (2006.01)
(52) U.S. Cl. .................. 358/3.06; 358/1.9; 358/3.01; 358/3.3; 382/194
(58) Field of Classification Search .......... 358/1.9, 358/2.1, 3.1, 3.06, 3.22, 3.3, 534; 348/222.1; 382/173, 176, 194, 260
See application file for complete search history.

(56) References Cited

U.S. PATENT DOCUMENTS

| | | | | |
|---|---|---|---|---|
| 5,911,004 A | * | 6/1999 | Ohuchi et al. | 382/173 |
| 6,052,484 A | * | 4/2000 | Kobayashi | 382/195 |
| 6,937,365 B2 | * | 8/2005 | Gorian et al. | 358/1.9 |
| 7,002,622 B2 | * | 2/2006 | Tanaka et al. | 348/222.1 |
| 7,034,962 B2 | * | 4/2006 | Suzuki | 358/2.1 |
| 7,092,124 B2 | * | 8/2006 | Nabeshima et al. | 358/1.9 |
| 7,099,045 B2 | * | 8/2006 | Nabeshima | 358/2.1 |
| 7,236,266 B2 | * | 6/2007 | Fuchigami | 358/1.9 |

FOREIGN PATENT DOCUMENTS

| | | |
|---|---|---|
| JP | 10-126631 | 5/1998 |
| JP | 2002-232708 | 8/2002 |
| JP | 2002-258420 | 9/2002 |
| JP | 2004-282546 | 10/2004 |

OTHER PUBLICATIONS

T. Makita, "High Quality Image Processing for Ink Jet Printers," pp. 47-53, Aug. 8, 2001.

* cited by examiner

*Primary Examiner*—King Y Poon
*Assistant Examiner*—Javier Segura
(74) *Attorney, Agent, or Firm*—David G. Conlin; Steven M. Jensen; Edwards Angell Palmer & Dodge LLP

(57) ABSTRACT

An image processing apparatus includes a document type automatic discrimination section that, based upon input image data read from a document, automatically discriminates a document type of the document. The document type automatic discrimination section, based upon plural types of parameters (quantity of halftone pixels, quantity of photographic-picture pixels, and quantity of high density pixels) obtained from plural types of characteristics (maximum density difference, total density busyness) extracted from the input image data and which parameters are used for discriminating a document type. A specific inkjet printed image whose output image data would not reach a standard level, if a process for a halftone reproduction region or a process for a continuous tone region were to be carried out on the input image data. This can improve the accuracy of document discrimination and the image quality of reproduced image.

3 Claims, 17 Drawing Sheets

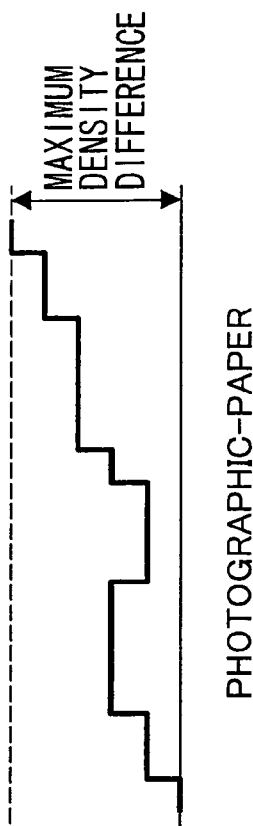
FIG. 3 (b) PHOTOGRAPHIC-PAPER
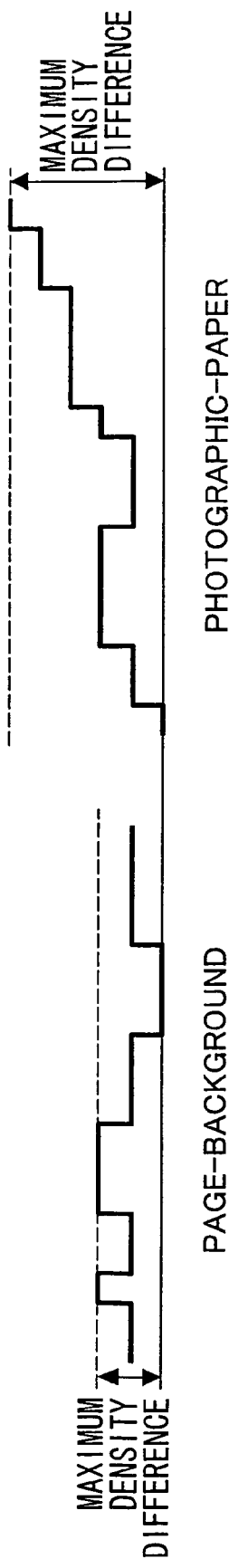
FIG. 3 (a) PAGE-BACKGROUND
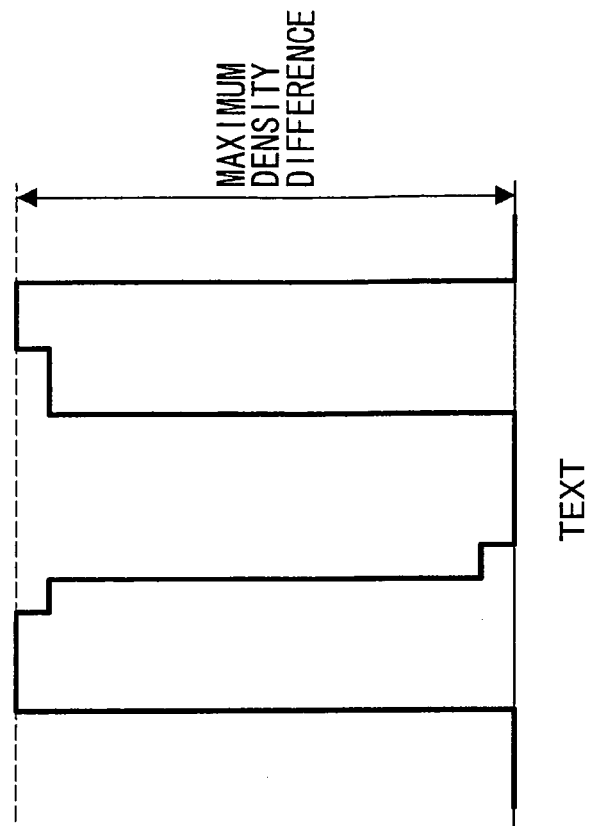
FIG. 3 (d) TEXT
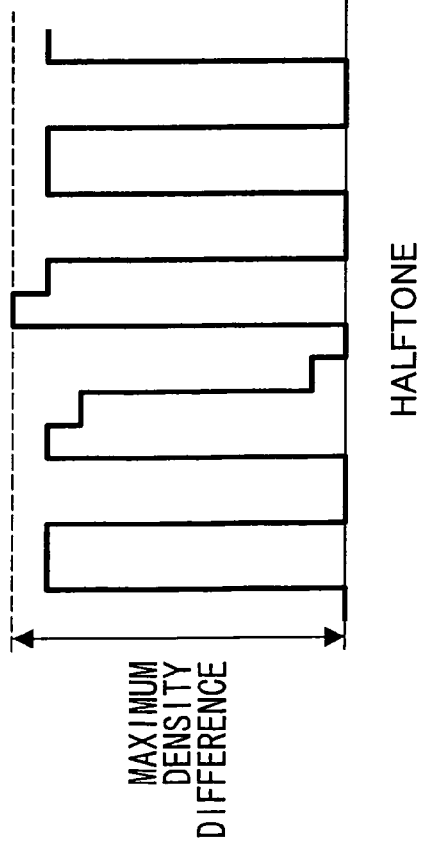
FIG. 3 (c) HALFTONE

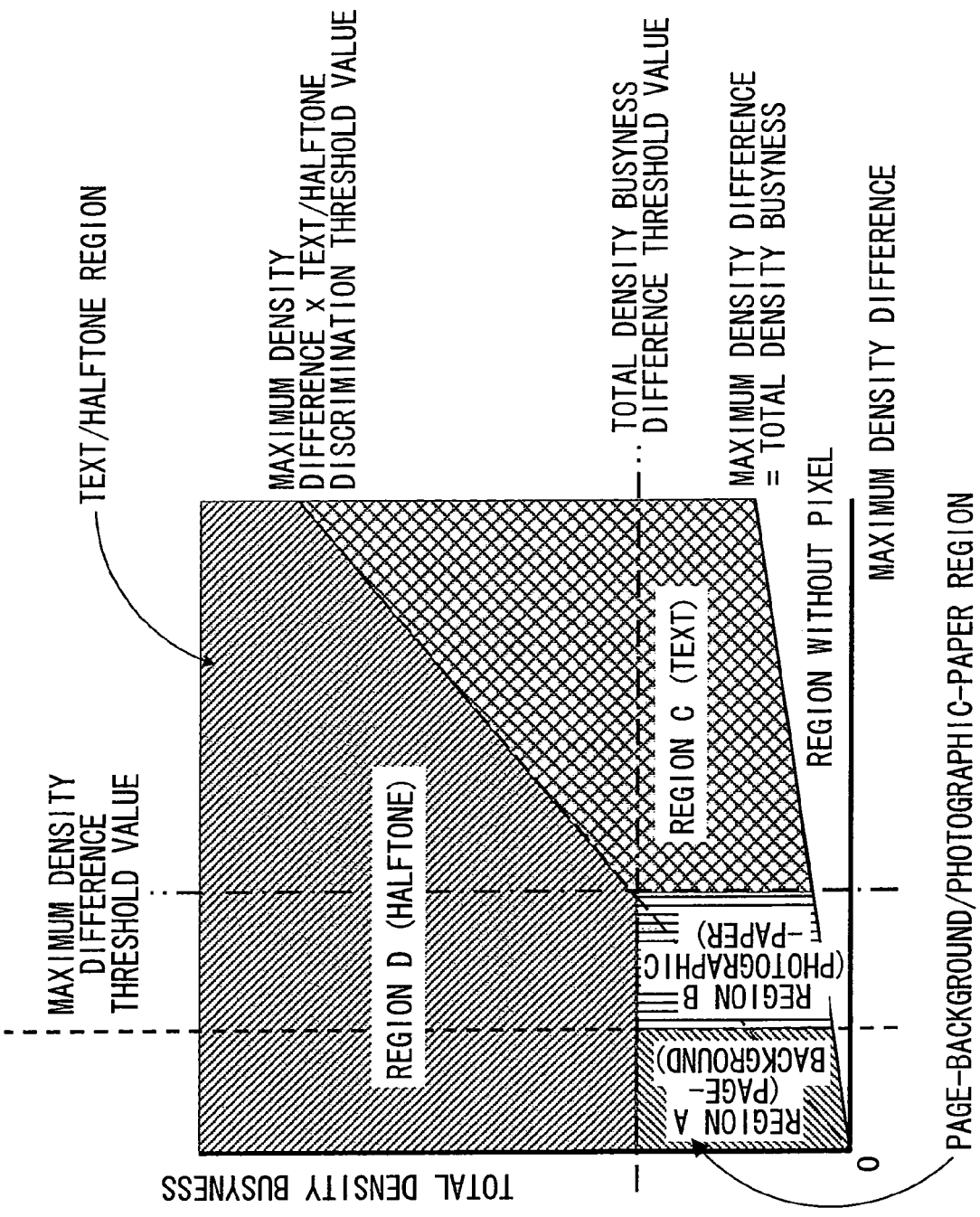
FIG. 4  PAGE-BACKGROUND/PHOTOGRAPHIC-PAPER DISCRIMINATION THRESHOLD VALUE

PRINT (HALFTONE) DOCUMENT

INKJET PRINTED IMAGE

IMAGE PROCESSING APPARATUS, IMAGE FORMING APPARATUS, METHOD FOR PROCESSING IMAGE, COMPUTER PROGRAM, AND RECORDING MEDIUM

This Nonprovisional application claims priority under 35 U.S.C. § 119(a) on patent application Ser. No. 303485/2004 filed in Japan on Oct. 18, 2004, the entire contents of which are hereby incorporated by reference.

FIELD OF THE INVENTION

The present invention relates to an image processing apparatus, an image forming apparatus, a method for processing an image, a computer program, and a recording medium, all of which can discriminate a document type of a document, based upon an image signal obtained by scanning the document.

BACKGROUND OF THE INVENTION

In the field of image forming apparatuses, such as a copying machine or a printer that employs an electrophotographic process or an inkjet printing system, full-color digital copying/Multi Function Printers that can reproduce color images with high image quality have been commercialized, due to advancements in digital image processing technology.

Document images duplicated by such image forming apparatuses contain text, line drawings, pictures, or combinations thereof. In order to obtain a finely reproduced image, it is necessary to perform an appropriate image process on the document.

Owing to the situation, modes, such as a text mode, a text/picture mode, or a picture mode, are prepared so as to function as operation modes of the image forming apparatuses for selecting a document type.

However, it is extremely bothersome for a user to switch between modes for each document. In addition, in many cases in which, for example, an inappropriate mode is selected, the images are significantly deteriorated, resulting in a wasted copy.

To solve the problem, there is a suggested an automatic discrimination of the document type.

For example, in Japanese Unexamined Patent Publication No. 10-126631 (published on May 15, 1998), in addition to conventional document types, such as a copy document, a silver salt film, and a halftone print, that have been subjects of classification, an image outputted by an inkjet printer is also included in the subjects of classification.

Specifically, characteristics in connection with a color reproduction area and characteristics in connection with texture are extracted from a digital color signal obtained by reading the document, and it is determined whether the document is a document outputted by an inkjet printer.

An image outputted by the inkjet printer is characterized in that brightness of cyan and magenta is greater than that of an ordinary halftone print document. This characteristic appears as a difference in the color reproduction area.

Further, because an error diffusion method or a dither method is used, there exist another characteristic where textures formed of dots exist on a white part of a paper. Although the difference in the color reproduction area between an image outputted with the inkjet printer and a document written with a highlighter is small (in a signal value read by an input apparatus, such as a color scanner, the difference in the color reproduction area between an image outputted with the inkjet printer and blue/violet lines in highlight colors is small), the image and the document can be discriminated by extracting the characteristics representative of the texture.

In Japanese Unexamined Patent Publication No. 10-126631 mentioned above, the inkjet printed image itself is recognized, and an appropriate process is carried out on the inkjet printed image, thereby improving image quality.

However, because the inkjet printer deals with various resolutions, color materials, output papers, and tone reproduction (error diffusion method, dither method), it is difficult to distinguish between all inkjet printed images. Even if the inkjet printed image is discriminated, having only one single document mode (single process) does not allow the inkjet printer to finely reproduce all inkjet printed images. For example, in a case where the document is an image outputted by an extremely high resolution inkjet printer (approximately 2800 dpi (dot per inch)) on a picture-dedicated paper, even if the document is read by an ordinary resolution input apparatus (approximately 600 dpi), it is difficult to read every single dot. Therefore, a result of reading result would be the same as that for the photographic-picture. In this case, better reproduction image is obtained by performing processing in the same manner as that for the photographic-picture.

For another example, in a case where a document is a document outputted by a low resolution inkjet printer (no more than 600 dpi) on plain paper or recycled paper, almost all dots can be read, and the color reproduction area is similar to that of a printed image. Therefore, it is difficult to determine the document as an inkjet printed image. In other words, the document has similar characteristics to that of the print document, making it difficult to be discriminated from the print document. In this case, better reproduction image is obtained by processing the document in the same manner as that for the text print document or the printed-picture document.

Further, in Japanese Unexamined Patent Publication No. 10-126631 mentioned above, in a case where an overall brightness of a document is relatively low, an inkjet printed image and a photographic-picture cannot be discriminated. Accordingly, an image cannot be finely reproduced.

SUMMARY OF THE INVENTION

An object of the present invention is to provide an image processing apparatus capable of discriminating (identifying) only an inkjet printed image that cannot be finely reproduced in conventional document modes, instead of discriminating all inkjet printed images (images outputted by an inkjet printing system), in a document type automatic discrimination process, thereby improving an accuracy of discrimination and an image quality of reproduced images.

An image processing apparatus of the present invention includes a document type automatic discrimination section that, based upon input image data read from a document, automatically discriminates a document type of the document. In order to solve the above problems, the image processing apparatus is characterized in that the document type automatic discrimination section, based upon plural types of parameters that are obtained from plural types of characteristics extracted from the input image data and which parameters are used for discriminating a document type, discriminates a specific inkjet printed image whose output image data would not reach a standard level, if a process for a halftone reproduction region or a process for a continuous tone region were to be carried out on the input image data.

Further, a method for processing an image of the present invention includes a document type automatic discrimination step of, based upon input image data read from a document, automatically discriminating a document type of the document, characterized in that the document type automatic discrimination step further includes steps of: extracting plural types of characteristics from the input image data; obtaining, based upon the characteristics, plural types of parameters used for discriminating a document type; and discriminating, based upon the parameters, a specific inkjet printed image whose output image data would not reach a standard level, if a process for a halftone reproduction region or a process for a continuous tone region were to be carried out on the input image data.

Further, a program of the present invention is a document type automatic discrimination program causing, based upon image data read from a document, a computer to execute a process of automatically discriminating a document type of the document, characterized in that the program causes a computer to execute procedures of: extracting plural types of characteristics from the input image data; obtaining, based upon the extracted characteristics, plural types of parameters used for discriminating a document type; and discriminating, based upon the obtained parameters, a specific inkjet printed image whose output image data would not reach a standard level, if a process for a halftone reproduction region or a process for a continuous tone region were to be carried out on the input image data.

Further, a recording medium in the present invention is a computer-readable recording medium storing a document type automatic discrimination program causing, based upon input image data read from a document, a computer to execute a process of automatically discriminating a document type of the document, characterized in that the recording medium stores a program causing a computer to execute procedures of: extracting plural types of characteristics from the input image data; obtaining, based upon the extracted characteristics, plural types of parameters used for discriminating a document type; and discriminating, based upon the obtained parameters, a specific inkjet printed image whose output image data would not reach a standard level, if a process for a halftone reproduction region or a process for a continuous tone region were to be carried out on the input image data.

In the above structure, instead of discriminating all inkjet printed images, only an inkjet printed image that cannot be finely reproduced in conventional modes (process for printed-picture documents, process for photographic-picture documents) are exclusively discriminated, thereby significantly improving the accuracy of discrimination. Further, by carrying out a most appropriate image process only on certain documents, image quality can be improved.

Additional objects, features, and strengths of the present invention will be made clear by the description below. Further, the advantages of the present invention will be evident from the following explanation in reference to the drawings.

BRIEF DESCRIPTION OF THE DRAWINGS

FIG. 3($a$) is a diagram showing a maximum density difference in a page-background region. FIG. 3($b$) is a diagram showing a maximum density difference in a photographic-paper region FIG. 3($c$) is a diagram showing a maximum density difference in a halftone region. FIG. 3($d$) is a diagram showing a maximum density difference in a text region.

FIG. 4 is a graph (distribution map) showing a relationship between the maximum density difference and the total density busyness. The vertical axis indicates the total density busyness, and the horizontal axis indicates the maximum density difference.

FIG. 10($b$) is a histogram showing a relationship between a pixel transition number and a quantity of pixels in an inkjet printed image.

DESCRIPTION OF THE EMBODIMENTS

First Embodiment

The following describes an embodiment of the present invention. In the following description, a case where an image processing apparatus of an embodiment in the present invention is applied to a digital color-copying machine is described. The condition is the same in other embodiments.

Figure 2:
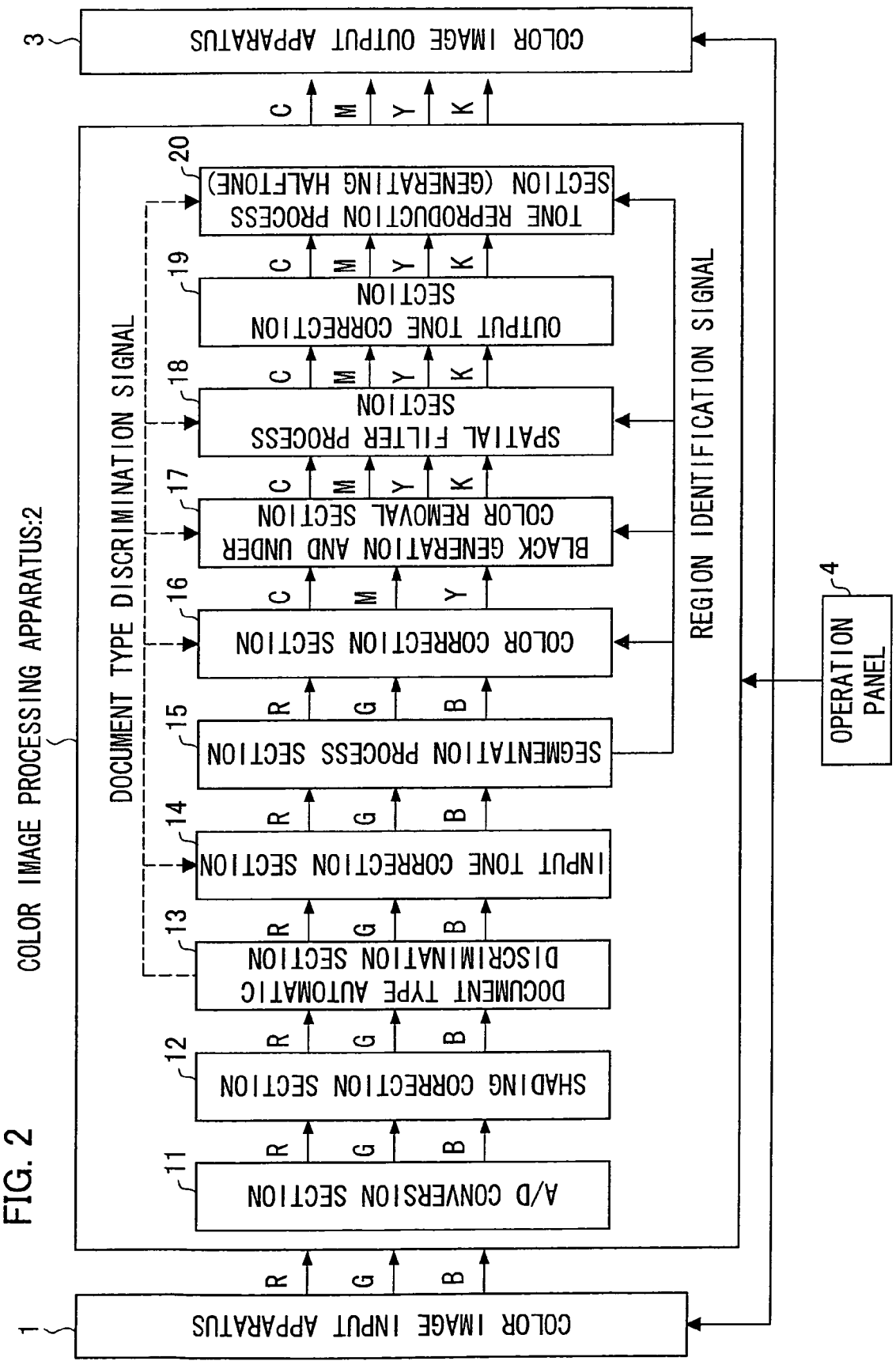
FIG. 2 is a block diagram illustrating a structure of a substantial part of an image forming apparatus including an image processing apparatus of an embodiment of the present invention.

FIG. 2 is a block diagram schematically illustrating a image processing apparatus of the embodiment is applied. structure of a digital color-copying machine to which a color As illustrated in FIG. 2, the digital color copying machine of the embodiment includes a color image processing apparatus 2 constituted of an A/D conversion section 11, a shading correction section 12, a document type automatic discrimination section 13, an input tone correction section 14, a segmentation process section 15, a color correction section 16, a black generation and under color removal section 17, a spatial filter process section 18, an output tone correction section 19, and a tone reproduction process section 20. A color image input apparatus 1, a color image output apparatus 3, and an operation panel 4 are connected to the color image processing apparatus 2, so as to form a digital color-copying machine as an aggregate.

The color image input apparatus (image reading section, reading unit) 1 is constituted of a scanner section (not illustrated) including, for example, a CCD (Charge Coupled Device). The color image input apparatus 1 reads a reflected light image from a document as an RGB (R: red, G: green, B: blue) analogue signal through the CCD, and inputs the signal to the color image processing apparatus 2.

The analogue signal read by the color image input apparatus 1 is transmitted to the sections in the color image processing apparatus 2 in the order of the A/D conversion section 11, the shading correction section 12, the document type automatic discrimination section 13, the input tone correction section 14, the segmentation process section 15, the color correction section 16, the black generation and under color removal section 17, the spatial filter process section 18, the output tone correction section 19, and the tone reproduction process section 20. Then, the analogue signal is outputted as a CMYK digital signal to the color image output apparatus 3.

The A/D (analogue/digital) conversion section 11 converts the RGB analogue signal into a digital signal. The shading correction section 12 removes a variety of distortions in the digital RGB signal supplied by the A/D conversion section 11, which distortions occurred in a lighting system, an image formation system, and an image pickup system of the color image input apparatus 1. In addition, the shading correction section 12 adjusts a balance of colors.

The document type automatic discrimination section 13 converts the RGB signal (RGB reflectivity signal) to which processes of removal of various distortions and adjustment of color balances were carried out by the shading correction section 12, into a signal (for example, a density signal) that is easy for an image processing system employed in the color image processing apparatus 2 to handle. In addition, the document type automatic discrimination section 13 discriminates a document type. A document type identification signal created in the document type automatic discrimination section 13 is outputted to the input tone correction section 14, the color correction section 16, the black generation and under color removal section 17, the spatial filter process section 18, and the tone reproduction process section 20. The document type automatic discrimination section 13 will be described in detail below.

The input tone correction section 14 adjusts image quality by, for example, removing page-background density or adjusting contrast.

The segmentation process section 15 classifies a pixel of the inputted image as a pixel belonging to a text region, a halftone region, or a picture region based upon the RGB signal. Based upon the discrimination result, the segmentation process section 15 outputs a region identification signal indicating to which region the pixel belongs to the color correction section 16, the black generation and under color removal section 17, the spatial filter process section 18, and the tone reproduction process section 20. In addition, the segmentation process section 15 transmits the input signal outputted by the input tone correction section 14, without any modification, to the color correction section 16, which is a subsequent section of the segmentation process section 15.

For faithful color reproduction, the color correction section 16 removes turbidness in colors, based upon spectral characteristics of CMY (C: cyan, M: magenta, Y: yellow) color materials containing unnecessary absorption elements.

The black generation and under color removal section 17 carries out a black generation process in which a black (K) signal is created out of the CMY three-color-signal to which color correction was carried out, and a process in which a new CMY signal is created by removing the K signal created in the black generation process from the original CMY signal. Consequently, the CMY three-color-signal is converted into a CMYK four-color-signal.

An example of the black generation process is a method of generating black with a skeleton black (ordinary method). In the method, assume that an input/output characteristic of a skeleton curve is $\{y=f(x)\}$, data to be inputted are C, M, and Y, data to be outputted are C', Y', and K', and a UCR (Under Color Removal) rate is a $(0<\alpha<1)$, a black generation and under color removal process is expressed as the following formulae (A) to (D):

$$K'=f\{\min(C,M,Y)\} \qquad (A);$$

$$C'=C-\alpha K' \qquad (B);$$

$$M'=M-\alpha K' \qquad (C); \text{ and}$$

$$Y'=Y-\alpha K' \qquad (D).$$

With respect to image data of the CMYK signal inputted by the black generation and under color removal section 17, the spatial filter process section 18 carries out a spatial filter process with a digital filter based upon the region identification signal, and corrects a characteristic of spatial frequency, thereby preventing fuzziness in outputted images and deterioration of graininess. In a similar manner as to the spatial filter process section 18, the tone reproduction process section 20 carries out a predetermined process to the image data in the CMYK signal, based upon the region identification signal.

For example, the intensity level for high frequency in the region classified as a text by the segmentation process section 15 is enhanced during a sharpness enhancement process in the spatial filter process carried out by the spatial filter process section 18 to improve reproducibility of especially black texts or color texts. At the same time, in the tone reproduction process section 20, either a binary process or a multi-level process, whichever is suitable for reproduction of high frequency, is selected to be carried out in a high resolution screen.

Further, the spatial filter process section 18 carries out a low pass filter process to a region classified as a halftone region by the segmentation process section 15, to remove input halftone elements. The output tone correction section 19 carries out an output tone correction process to convert the signals, such as density signals, into tone values that are characteristics of the color image output apparatus 3. Then, the tone reproduction process section 20 carries out a tone reproduction process (halftone creation) to eventually divide the image into pixels so that each tone becomes reproducible. With respect to a region classified as a picture region by the segmentation process section 15, either a binary process or a multi-level process that emphasizes tone reproducibility is carried out in a screen.

The operation panel 4 is constituted of, for example, a display section (not illustrated), such as a liquid crystal display, and a setting button. Based upon information inputted by the operation panel 4, operation of the color image input apparatus 1, the color image processing apparatus 2, and the color image output apparatus 3 is restricted.

The image data to which the above processes are carried out is temporality stored in a storing section, is read at a predetermined timing, and is inputted into the color image output apparatus 3. The color image output apparatus 3 outputs image data on a recording medium (for example, paper). An exemplary color image output apparatus 3 includes a color image output apparatus employing an electrophotographic system or an inkjet printing system, but the color image output apparatus 3 is not limited thereto. The above processes are restricted by a CPU (Central Processing Unit, not illustrated).

As the method for automatic classification of document types, for example, the method disclosed in Japanese Unexamined Patent Publication No. 2002-232708 (published on Aug. 16, 2002) may be used. In the embodiment, in addition to the art disclosed in the publication, density information of a document image is further included as a parameter used for classifying the document type, and a specific document among inkjet printed images is discriminated.

Figure 1:
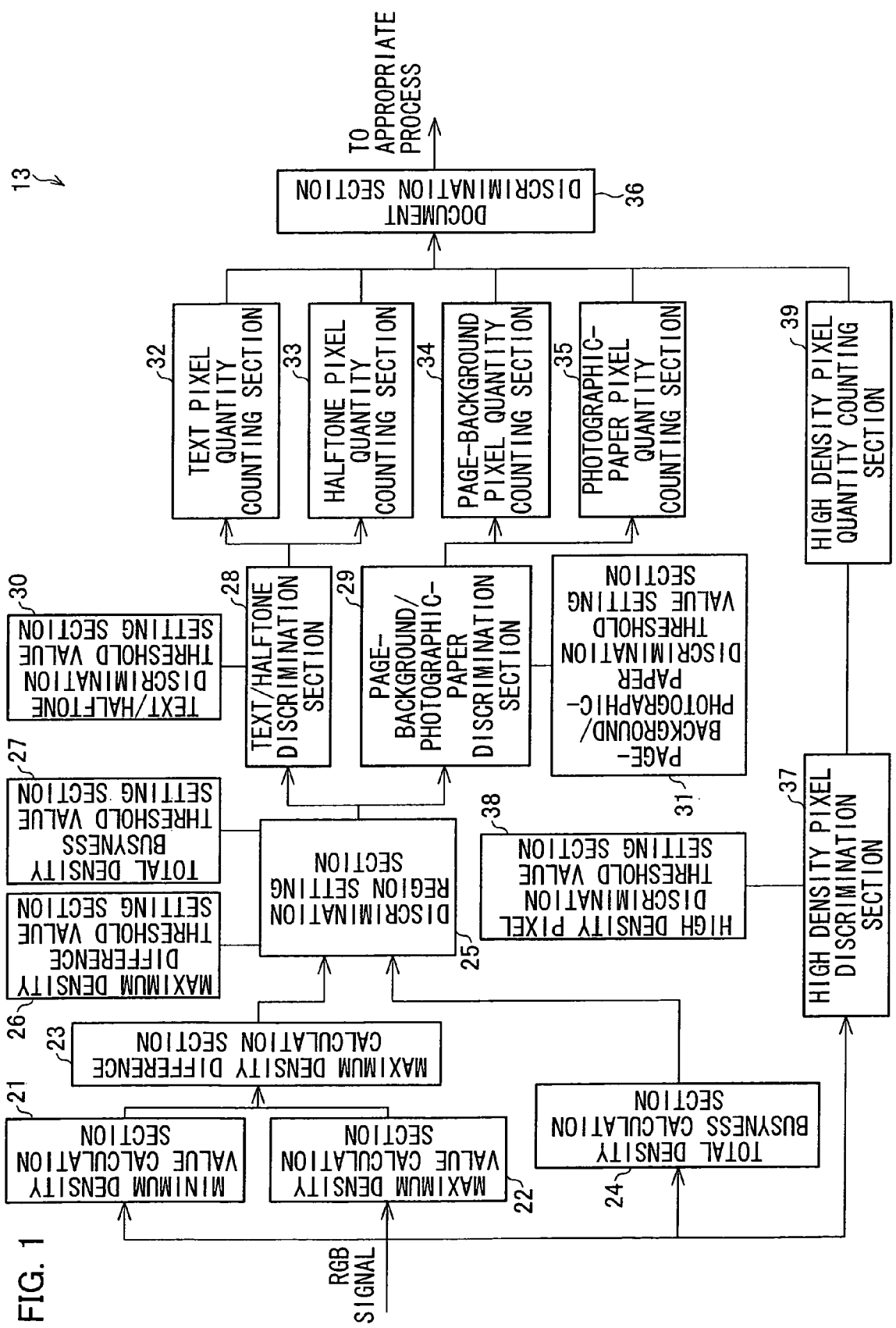
FIG. 1 is a block diagram illustrating a structure of a substantial part of a document type automatic discrimination section contained in an image processing apparatus of an embodiment of the present invention.

FIG. 1 is a block diagram schematically illustrating the document type automatic discrimination section 13 of the embodiment.

As illustrated in FIG. 1, the document type automatic discrimination section 13 includes a minimum density value calculation section 21, a maximum density value calculation section 22, a maximum density difference calculation section 23, a total density busyness calculation section 24, a discrimination region setting section 25, a text/halftone discrimination section 28, a page-background/photographic-paper discrimination section 29, a high density pixel discrimination section 37, a text pixel counting section 32, a halftone pixel counting section 33, a page-background pixel counting section 34, a photographic-paper pixel counting section 35, a high density pixel counting section 39, and a document discrimination section 36.

The minimum density value calculation section 21 calculates a minimum density value of an n-by-m (for example, 15×15) block containing a target pixel. The maximum density value calculation section 22 calculates a maximum density value of the block. The target pixel is a pixel positioned at a center of the n-by-m block.

The maximum density difference calculation section (maximum density difference calculation section) 23 calculates a maximum density difference, based upon the minimum density value calculated by the minimum density value calculation section 21 and the maximum density value calculated by the maximum density value calculation section 22. Specifically, the maximum density difference calculation section 23 calculates the maximum density difference by figuring out the difference between the maximum density value and the minimum density value.

The total density busyness calculation section 24 calculates a total density busyness by figuring out the sum of absolute values of density differences between adjoining pixels in the block.

The discrimination region setting section 25 compares the maximum density difference calculated by the maximum density difference calculation section 23 and the total density busyness calculated by the total density busyness calculation section 24, with respective threshold values, so as to classify the target pixel into the page-background region/photographic-paper (photographic-picture) region or the text region/halftone region. Specifically, the discrimination region setting section 25 compares the maximum density difference and the total density busyness with the respective threshold values, so as to determine which one of the page-background region/photographic-paper region or the text region/halftone region the target pixel belongs to.

The text/halftone discrimination section 28 determines which one of the regions, the text region or the halftone region, the pixel classified into the text region/halftone region by the discrimination region setting section 25 belongs to (classifies the target pixel either as a pixel belonging to the text region or a pixel belonging to the halftone region).

The page-background/photographic-paper discrimination section 29 determines which one of the page-background region or the photographic-paper region the pixel classified as a pixel belonging to the page-background region/photographic-paper region by the discrimination region setting section 25 belongs to (classifies the target pixel either as a pixel belonging to the page-background region or a pixel belonging to the photographic-paper region).

The high density pixel discrimination section 37 determines whether the target pixel is a pixel belonging to a high density region.

The text pixel counting section 32 counts a quantity of pixels classified as a pixel belonging to the text region by means of the text/halftone discrimination section 28.

The halftone pixel counting section 33 counts a quantity of pixels classified as a halftone region by the text/halftone discrimination section 28. In other words, the halftone pixel counting section 33 counts a quantity of pixels belonging to the halftone image region in the image read from the color image input apparatus 1.

The page-background pixel counting section 34 counts a quantity of pixels classified as a pixel belonging to the page-background region by the page-background/photographic-paper discrimination section 29.

The photographic-paper pixel counting section 35 counts a quantity of pixels classified as a pixel belonging to the photographic-paper region by the page-background/photographic-paper discrimination section 29. In other words, the photographic-paper pixel counting section 35 counts a quantity of pixels belonging to the photographic-paper region (continuous tone region) in the image read from the color image input apparatus 1.

The high density pixel counting section 39 counts a quantity of pixels classified as a pixel belonging to the high density region by the high density pixel discrimination section 37. Specifically, the high density pixel counting section 39 counts a quantity of pixels with a density higher than a predetermined density in the image read from the color image input apparatus 1.

Based upon results of counting a quantity of pixels in each region by the respective counting sections 32, 33, 34, 35, and 39, the document discrimination section 36 determines a document type.

Further, the discrimination region setting section 25 includes a maximum density difference threshold value setting section 26 and a total density busyness threshold value setting section 27.

The maximum density difference threshold value setting section 26 sets a maximum density difference threshold value used for determining, based upon the result of calculation by the maximum density difference calculation section 23, which one of the page-background region/photographic-paper region or the text region/halftone region the target pixel belongs to. The total density busyness threshold value setting section 27 sets a total density busyness threshold value used for determining, based upon the result of calculation by the total density busyness calculation section 24, which one of the page-background region/photographic-paper region and the text region/halftone region the target pixel belongs to.

The text/halftone discrimination section 28 includes a text/halftone discrimination threshold value setting section 30 that sets a text/halftone discrimination threshold value used for determining which one of the text region or the halftone region the target pixel belongs to. The page-background/photographic-paper discrimination section 29 includes a page-background/photographic-paper discrimination value setting section 31 that sets a page-background/photographic-paper discrimination threshold value used for determining which one of the page-background region or the photographic-paper region the target pixel belongs to.

Further, the high density pixel discrimination section 37 includes a high density pixel discrimination threshold value setting section 38 that sets a high density pixel discrimination threshold value used for determining whether the target pixel is a pixel belonging to the high density region.

The following describes a distribution of pixel density in the text region, the halftone region, the photographic-paper (photo) region, and page-background region respectively, with reference to FIGS. 3(*a*) to 3(*d*). Further, a relationship between the maximum density difference and the total density busyness in each region will be described, with reference to a distribution map in FIG. 4.

The total density busyness is always greater than the maximum density difference. Therefore, in FIG. 4, no pixel exists in the region where the total density busyness is equal to or less than the maximum density difference (area surrounded by a horizontal axis and a direct line indicating that the maximum density difference is equal to the total density busyness).

Further, the maximum density difference and the total density busyness in the page-background region and the photographic-paper region are smaller than the maximum density difference and the total density busyness in the text region and the halftone region. Therefore, by comparing the maximum density difference with the maximum density difference threshold value, and comparing the total density busyness with the total density busyness threshold value, it becomes possible to determine which one of the page-background/photographic-paper region or the text/halftone region the target pixel belongs to. Specifically, a target pixel with the maximum density difference less than the maximum density difference threshold value and the total density busyness less than the total density busyness threshold value is classified as a pixel belonging to the page-background/photographic-paper region. A target pixel not satisfying the above conditions is classified as a pixel belonging to the text/halftone region.

Further, as illustrated in FIG. 3(*a*), because the density change in the density distribution of the page-background region is monotonous, the maximum density difference and the total density busyness are very small. Pixels of the page-background region are distributed in a region A in FIG. 4 (the maximum density difference in the page-background region is less than the maximum density difference in the photographic-paper region). Therefore, if the maximum density difference of the pixel classified as a pixel belonging to the page-background/photographic-paper region is less than the page-background/photographic-paper discrimination threshold value, the pixel can be classified as a pixel belonging to the page-background pixel.

Further, as illustrated in FIG. 3(*b*), the density change in the density distribution of the photographic-paper region is usually smooth. Because the maximum density difference and the total density busyness are small but slightly greater than ones in the page-background region, pixels belonging to the photographic-paper region are distributed in a region B in FIG. 4. Therefore, if the maximum density difference of the pixel classified as a pixel belonging to the page-background region/photographic-paper region is greater than the page-background/photographic-paper discrimination threshold value, the pixel can be classified as a pixel belonging to the photographic-paper region.

Further, a density distribution of the halftone region is as illustrated in FIG. 3(*c*). The maximum density difference varies depending upon a halftone, and a number of variations in density is as many as the quantity of halftones. Therefore, the proportion of the total density busyness to the maximum density difference becomes high. Accordingly, pixels belonging to the halftone region are distributed in a region D in FIG. 4. Therefore, a pixel that is classified as a pixel belonging to the text/halftone region, and that has a greater total density busyness than a product of the maximum density difference and the text/halftone discrimination threshold value can be classified as a pixel belonging to the halftone pixel.

As illustrated in FIG. 3(*d*), the maximum density difference in a density distribution of the text region is great, and therefore the total density busyness is also great. However, a change in density in the text region is less than a change in that in the halftone region. Therefore, the total density busyness is less than one in the halftone region. Especially, in the text region a proportion of the total density busyness to the maximum density difference is low. Accordingly, pixels of the text region are distributed in a region C in FIG. 4. Therefore, a pixel that is classified as a pixel belonging to the text/halftone region, which has a total density busyness less than a product of the maximum density difference and the text/halftone discrimination threshold value can be classified as a pixel belonging to the text pixel.

Figure 5:
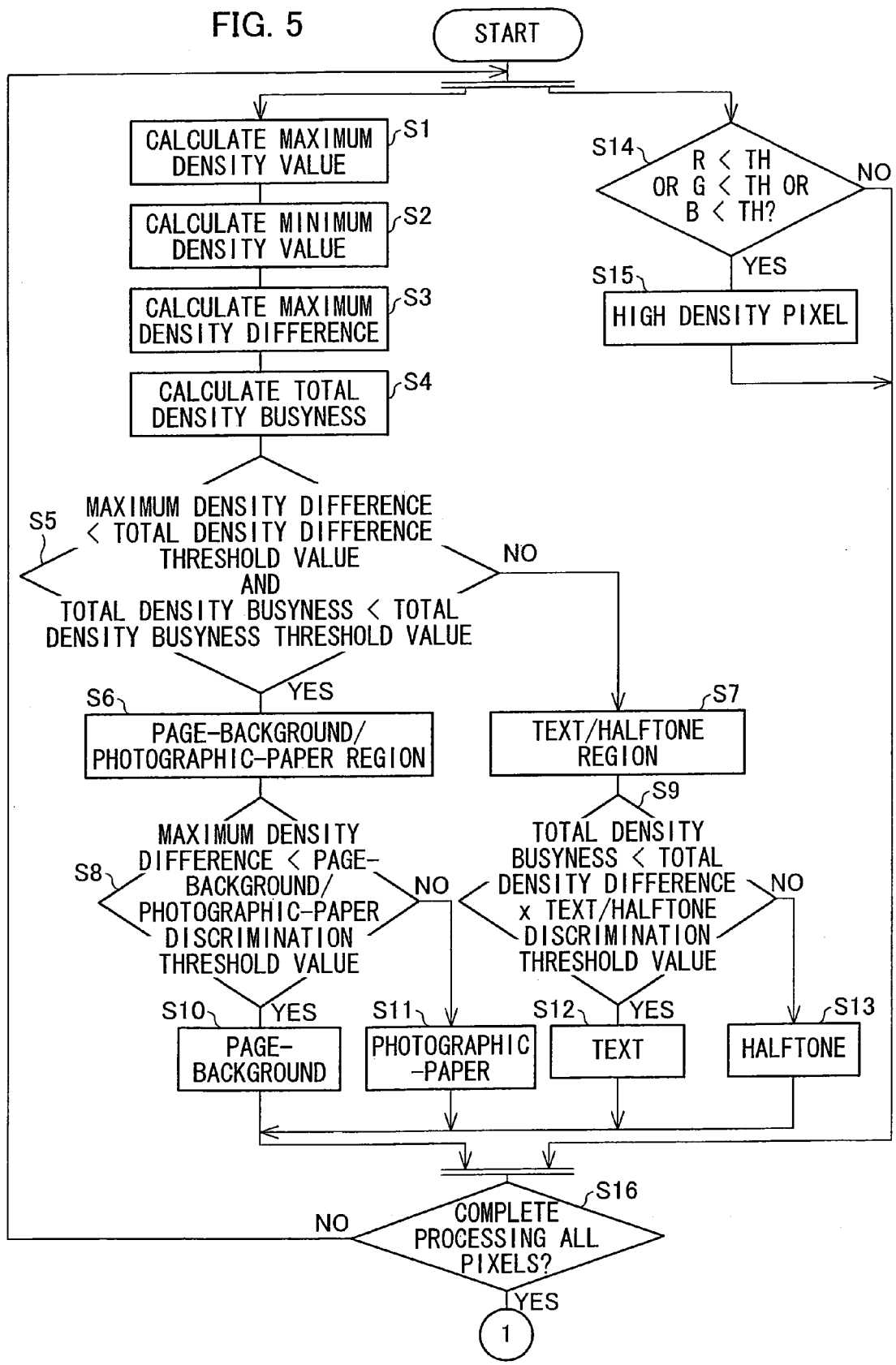
FIG. 5 is a flow chart illustrating a part of a flow in a document type discrimination process carried out by the document type automatic discrimination section in FIG. 1.

The following describes operations in a document type discrimination process, using the principle of area discrimination as described above, with reference to the block diagram in FIG. 1 and the flow chart in FIG. 5. The description will be made with reference to an n-by-m (for example, 15×15) block containing a target pixel.

Initially, the maximum density value calculation section 22 calculates a maximum density value of the n-by-m block containing the target pixel (S1), and the minimum density value calculation section 21 calculates a minimum density value of the block (S2). Subsequently, the maximum density difference calculation section 23 calculates a maximum density difference based upon the maximum density value calculated in S1 and the minimum density value calculated in S2 (S3), and the total density busyness calculation section 24 calculates a sum of absolute values of density differences of adjoining pixels in the block, that is, a total density busyness (S4).

Then, the discrimination region setting section 25 compares the maximum density difference calculated in S3 with the maximum density difference threshold value, and the total density busyness calculated in S4 with the total density busyness threshold value (S5). In a case where the maximum density difference is less than the maximum density difference threshold value, and the total density busyness is less than the total density busyness threshold value, the discrimination region setting section 25 classifies the target pixel contained in the block as a pixel belonging to the page-background/photographic-paper region (S6). On the other hand, in a case where the above conditions are not satisfied in S5, the discrimination region setting section 25 classifies the target pixel as a pixel belonging to the text/halftone region (S7).

With respect to the target pixel classified as a pixel belonging to the page-background/photographic-paper region in S6, the page-background/photographic-paper discrimination section 29 compares the maximum density difference calculated in S3 with the page-background/photographic-paper discrimination threshold value (S8). In a case where the maximum density difference is smaller, the target pixel is classified as a pixel belonging to the page-background region (S10). In a case where the maximum density difference is greater, the target pixel is classified as a pixel belonging to the photographic-paper region (S11).

On the other hand, with respect to the target pixel classified as a pixel belonging to the text/halftone region in S7, the text/halftone discrimination section 28 compares the total density busyness calculated in S4 with a product of the maximum density difference and the text/halftone discrimination threshold value (S9). In a case where the total density busyness is smaller, the target pixel is classified as a pixel belonging to the text region (S12). In a case where the total density busyness is greater, the target pixel is classified as a pixel belonging to the halftone region (S13).

Normally, each pixel in a document image acts as the target pixel, and the steps of S1 to S13 are carried out on each of the pixels, so as to classify the pixel as a pixel belonging to the page-background region, the photographic-paper region, the text region, or the halftone region. Then, based upon discrimination information, a document type is discriminated.

In this case, the document type is determined by, for example, classifying a pixel using pre-scanned image data, counting a quantity of classified pixels for each region, and respectively comparing the quantity with previously prepared threshold values for the page-background region, the photographic-paper region, the halftone region, and the text region. In other words, after the steps of S1 to S13 are carried out on the document image, a quantity of pixels classified as a pixel belonging to the page-background region (quantity of ground pixels), a quantity of pixels classified as a pixel belonging to the photographic-paper region (quantity of photographic-paper pixels), a quantity of pixels classified as a pixel belonging to the text region (quantity of text pixels), and a quantity of pixels classified as a pixel belonging to the halftone region (quantity of halftone pixels) are counted.

Then, for example, in a case where a proportion of the quantity of pixels in the text region to the total quantity of pixels is greater than the corresponding threshold value, and a proportion of the quantity of pixels in the halftone region to the total quantity of pixels is greater than the corresponding threshold value, the document type is determined as a text/halftone document (text/printed-picture document). Further, assume that accuracy of detection increases in the order of the text, the halftone, and the photographic-paper (photographic-picture), in a case where the proportion of the quantity of pixels in the text region to the total quantity of pixels is 30%, the document type is determined as the text document. In a case where the proportion of the quantity of pixels in the halftone region to the total quantity of pixels is 20%, the document type is determined as the halftone document (printed-picture document). In a case where the proportion of the quantity of pixels in the photographic-picture region to the total quantity of pixels is 10%, the document type is determined as the photographic-picture region. Document types for determination here include the text document, the text/printed-picture document, the printed-picture document, the photographic-picture document, and the text photographic-picture document. Instead of prescanning, the determination of the document types may be carried out with image data temporarily stored in the storing section, such as a hard disk.

The following describes processes to be carried out after the document type discrimination process.

In a case where a document image contains only one region, the same process as the above-described process of separating regions is carried out. On the other hand, in a case where the document image contains two or more regions, an intermediate parameter of parameters used in a process for each region is used, avoiding a parameter used in a process for a region that was not recognized in the document type discrimination process.

For example, in a case where an input image (document) is classified as a text document, a correction curve removing a greater amount of highlights than usual, and enhancing contrasts, is employed in the input tone correction process.

Further, with respect to a color text, a color correction process in which emphasis is placed on color saturation is carried out. On the other hand, with respect to a black text, a black generation and under color removal process in which a generation amount of black is set at a greater amount than usual, is carried out. Further, with respect to texts, parameters are switched; for example, filter coefficients are set so as to weaken a degree smoothing. In addition, edges are enhanced by a spatial filter process.

In a case where the input image is classified as a text photographic-picture document, in each process, a process is carried out using an intermediate parameter of parameters used in the text document process and the photographic-picture document process. Depending on which one of the text document or the photographic-picture document is considered more important, in the input tone correction process, highlight is removed and contrast is adjusted using an intermediate parameter of parameters used in the photographic-picture document process and the text document process. In addition, a color correction process is carried out so that intensity of color saturation or characteristics of tone are not extremely off-balance. Further, in the black generation and under color removal process, the generation amount of black should be adjusted in such a way that the photographic-picture image is not affected.

The following describes an example in which the document (the document will be referred to as an inkjet printed image, hereinafter) created by the inkjet printing system through the above-described steps of S1 to S13 is read and classified.

(1) Office Document (for example, diagrams) Outputted on, for example, Plain Papers With respect to office documents outputted on, for example, plain papers, a document constituted of only lines and texts (for example, a diagram) is classified as a "text document". Carrying out the same process as that for text documents such as printed matter causes no problem.

In a case where the document contains, for example, a color diagram, the diagram portion is recognized as halftones, and therefore the document is classified as a "text print document". A smoothing process for reducing moire is carried out on the diagram portion recognized as halftones, thereby suppressing graininess. Therefore, carrying out the same process as that for text documents causes no problem.

Inkjet documents printed out on plain papers are less bright than those printed out on picture-dedicated papers; inkjet printed image printed out on plain papers appear to be dull in color. Therefore, it is appropriate for the color correction process to use a color correction table for the printed-picture documents (for the halftone documents).

(2) Picture (Picture-Dedicated Paper) Outputted with a High Resolution Inkjet Printing System With regard to a picture outputted by an image forming apparatus (for example, printers, copying machines, or complex machines) with high resolution (for example, 2880 dpi) inkjet printing system, an ordinary color copying machine (approximately 600 dpi) cannot read most of the pixels therein. Therefore, the picture is classified as a "photo document". Because the pixels cannot be read, no graininess occurs. In addition, a color reproduction area of the photographic-picture is similar to that of the picture outputted on a picture-dedicated paper by the inkjet printing system. Therefore, the color correction table for photographic-pictures may be used, causing no problem.

(3) Pictures Outputted with a Medium-Low Resolution Inkjet System

With respect to a picture outputted by an image forming apparatus with medium-low (approximately 1200 dpi) resolution inkjet printing system, an ordinary color copying machine (approximately 600 dpi) can read some pixels. For example, in a low density region of a document outputted by a medium-low resolution inkjet printing system, crowdedness of pixels is low. In other words, pixels are at a distance from each other. Therefore, the presence of the pixels can be determined even with a low resolution image reading apparatus. As the density increases, it becomes difficult to determine the presence of the pixels, and therefore it becomes difficult to discriminate from the photographic-paper region. This case is categorized into three patterns below.

In the following description, input image data is assumed to be an RGB signal. In other words, heavy density (high density, large density) indicates that a value of a color element of the RGB signal is low, and light density (low density, small density) indicates that values of all color elements of the RGB signal are high.

I: A Case where Overall Density is Low

In a case where overall density is low, halftone pixels can be counted all over the image, and the document is classified as a "printed-picture document (or text/printed-picture document)". In this case, a smoothing process for reducing moire is carried out on the region classified as a halftone region. Further, because the overall density is low, a color correction process for a printed-picture document can be carried out without problem.

II: A Case where Overall Density is High

In a case where overall density is high, few regions are classified as a halftone region, and the document is classified as a "photographic-picture document". Because pixels cannot be read all over the image, no graininess occurs. Therefore, the color correction process for printed-picture documents may be carried out without problem.

III: A Case where Both Low Density Area and High Density Area Exist

In addition to a small quantity of halftone pixels being counted, both a high density region and a low density region exist. Therefore, depending on the contents of the image, the image may be classified as a printed-picture document or the photographic-picture document. This results on inconsistency of determination. For example, in a case where the image is classified as a printed-picture document, no graininess occurs in the low density region, but a tone distortion sometimes occurs in the high density region (dark region and bright region). In a case where the image is classified as a photographic-picture, no tone distortion occurs in the high density region but graininess sometimes occurs in the low density region.

Such a document containing both a low density region and a high density region is considered to have characteristics intermediate to those of the printed-picture document and the photographic-picture document. Accordingly, a problem that is similar to the one occurring when the photographic-picture document is outputted in the printed-picture mode, or when the printed-picture document is outputted in the photographic-picture mode, occurs.

As described above, the image may be deteriorated only in the case of (3)-III, in which the picture is outputted by the image forming apparatus with a medium-low resolution (approximately 1200 dpi) inkjet printing system, and both low density region and high density region exist. Therefore, by identifying a document of this case as the specific inkjet printed image, all documents outputted by the inkjet printing system can be finely reproduced.

The followings are conditions for discriminating a specific inkjet printed image:

(a) A quantity of counted halftone pixel is not many (within a predetermined value range);

(b) A quantity of counted high density pixel is greater than a threshold value; and (c) A quantity of counted photographic-paper pixel is greater than a threshold value.

The condition (c) is not mandatory, but accuracy of determination can be improved by taking the condition (c) into consideration. A formula for determination may be set based upon these three parameters, or determination may be carried out based upon a look-up table of a combination of parameters.

Accordingly, in the Embodiment, as illustrated in the flow chart in FIG. 5, processes of S14 to S15 with respect to a high density pixel are carried out concurrently with the processes of S1 to S13.

Specifically, the high density pixel discrimination section 37 classifies a pixel with a higher density than a predetermined density (or a pixel with a same or higher density than a predetermined density) as a high density pixel (S14), and the high density pixel counting section 38 counts a quantity of the high density pixels (S15).

Not only bright colors, such as RGBCMY, but also dark colors, such as black, are counted as the high density pixels.

In S14 in FIG. 5, the following formula ($\alpha$) is simply used as a condition for determination of a high density pixel:

$$R<TH, G<TH, \text{ or } B<TH \qquad (\alpha).$$

In other words, a pixel satisfying the above conditional formula ($\alpha$) is classified as a high density pixel. Because high density (heavy density) indicates that a value of a color element of the RGB signal is low, and low density (light density)

indicates that values of all colors of the RGB signal are high, the formula (α) is used as the condition for determination of a high density pixel.

In the conditional formula (α), a value of the threshold value TH may be set differently in each color element. For the threshold value TH, in a case where the input image data is 8 bits, for example, a value of approximately 30 is assigned.

In other words, in S14, a pixel with any of R, G, and B, smaller than the threshold values TH is classified as a high density pixel, and is counted as a high density pixel. The quantity of high density pixels in the document image is counted, in the manner as described above.

Then, in S16 of the flow chart illustrated in FIG. 5, it is determined whether all pixels are classified and counting of the page-background pixel, the photographic-paper pixel, the text pixel, the halftone pixel, and the high density pixel is carried out. Then, the document type is determined (the specific inkjet printed image is discriminated).

Figure 6:
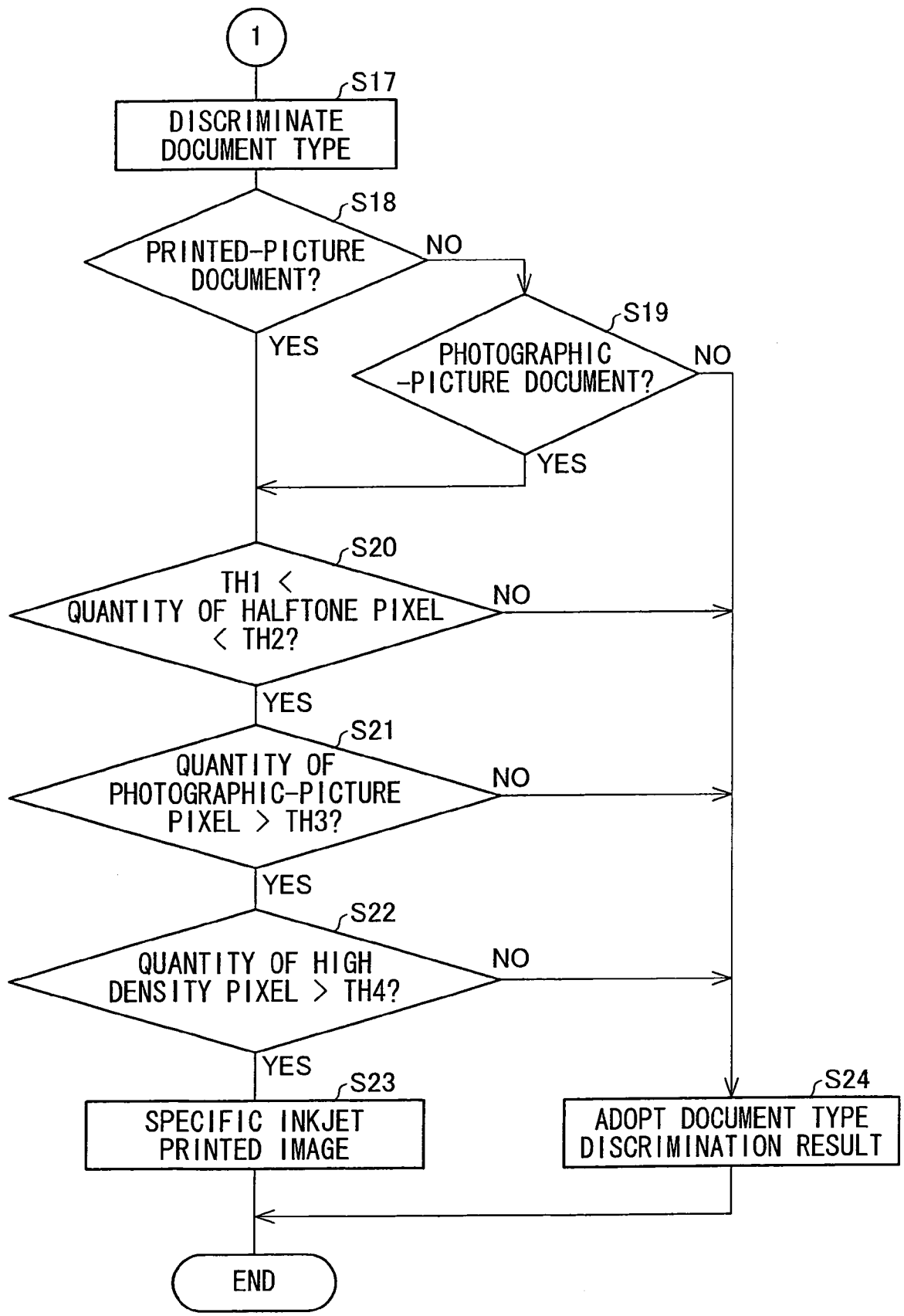
FIG. 6 is a flow chart illustrating a flow in a process carried out by the document type automatic discrimination section in FIG. 1. In the process, a printed-picture document and a photographic-picture document are first discriminated, and then a specific inkjet printed image is discriminated.

The following describes a flow of a process for discriminating the specific inkjet printed image, with reference to the flow chart in FIG. 6.

A quantity of halftone pixels, a quantity of photographic-paper pixels, and a quantity of high density pixels will be referred to as Cs, Cp, and Ch, respectively.

Initially, the document discrimination section 36 determines the document type, based upon the information obtained through the flow chart in FIG. 5 (quantity of page-background pixels, quantity of photographic-paper pixels, quantity of text pixels, quantity of halftone pixels) (S17).

Subsequently, the document discrimination section 36 determines whether the document type determined in S17 is the printed-picture document (S18). In a case where the document discrimination section 36 determines that the document type is not the printed-picture document, the process goes to S19. In a case where the document discrimination section 36 determines that the document type is the printed-picture document, the process goes to S20.

In S19, the document discrimination section 36 determines whether the document type determined in S17 is the photographic-picture document. In a case where the document discrimination section 36 determines that the document type is the photographic-picture document, the process goes to S20. In a case where the document discrimination section 36 determines that the document type is not the photographic-picture document, the process goes to S24, and the determination result in S17 is adopted as the determination result of the document type.

In S20, the document discrimination section 36 determines whether the quantity of halftone pixel is within a predetermined value range (whether the quantity of halftone pixel is many), in accordance with the conditional formula (β) below:

$$TH1 < Cs < TH2 \qquad (\beta).$$

In a case where the above conditional formula (β) is not satisfied, the document discrimination section 36 moves the process to S 24, and a result determined in S17 is adopted as the determination result of the document type.

The threshold value TH1 in the conditional formula (β) is a threshold value for differentiating the photographic-picture and the specific inkjet printed image. The threshold value TH1 indicates a minimum quantity of counted halftone pixels, below which the specific inkjet printed image is not to be classified as a photographic-picture. For the threshold value TH1, for example, a value of approximately 3% to 5% of total pixels in the entire image is assigned to TH1.

The threshold value TH2 in the conditional formula (β) is a threshold value for identifying the printed-picture and the specific inkjet printed image. The threshold value TH2 indicates a maximum quantity of counted halftone pixels, below which the specific inkjet printed image is not to be classified as a printed-picture. For the threshold value TH2, for example, a value of approximately 10% to 20% of pixels in the entire image is assigned to TH2.

Subsequently, the document discrimination section 36 determines whether a quantity of the photographic-paper pixel (photo pixel) is equal to or greater than a predetermined value, in accordance with the conditional formula (γ) below (S21):

$$Cp > TH3 \qquad (\gamma).$$

This step is not mandatory, but accuracy of determination can be improved by taking the determination in this step into consideration. The printed-picture document contains few pixels classified as a pixel belonging to the photographic-paper region, whereas the specific inkjet printed image contains no small quantity of pixels classified as a pixel belonging to the photographic-paper region. The process determines this characteristic.

In a case where the conditional formula (γ) is not satisfied, the document discrimination section 36 moves the process to S24, and a result determined in S17 is adopted as the determination result of document type.

The threshold value TH3 is a threshold value for identifying the printed-picture document containing a small halftone portion and the specific inkjet printed image. The threshold value TH3 indicates a minimum quantity of counted photographic-paper pixels, below which the specific inkjet printed image is not to be classified as a printed-picture document. For the threshold value TH3, for example, a value of approximately 2% to 5% of the total pixels in the entire image is assigned to TH3.

Subsequently, the document discrimination section 36 determines whether the document image contains a pixel with a rather high degree of density, in accordance with the conditional formula (δ) (S22):

$$TH4 < Ch \qquad (\delta).$$

In a case where the conditional formula (δ) is not satisfied, the document discrimination section 36 moves the process to S24, and a result determined in S17 is adopted as the determination result of document type.

The threshold value TH4 indicates a maximum quantity of high density pixel at which no deterioration in image quality is observed when a tone distortion occurs. For the threshold value TH4, for example, a value of approximately 5% to 10% of the total pixels in the entire image is assigned.

As described above, in a case where the document is determined as either the printed-picture document or the photographic-picture document, and the conditions set forth in S20, S21, and S22 are satisfied, the document is further determined as a specific inkjet printed image (S23).

In the above process, the document discrimination section 36 first determines the document type, and carries out the processes of S20 to S22 only when the document type is determined as the "photo document" or the "printed-picture document". In this case, no matter whether the document contains a text, the processes to be carried out remain the same. Therefore, description is made only on the photographic-picture document and the printed-picture document. The "printed-picture document" may be replaced with a "printed-picture document or text/printed-picture document".

Further, an existing hardware can be readily modified for the processes up to discrimination of document type in S17, facilitating sourcing of hardware.

Further, in the above processes, the pixels are classified as a pixel belonging to the page-background region, the photographic-paper region, the text region, or the halftone region. Then, the document type is determined. Subsequently, a specific inkjet printed image is discriminated. Instead, without determination of the document type, simply, the pixel may be classified as a pixel belonging to the page-background region, the photographic-paper region, the text region, or the halftone region, and then a specific inkjet printed image may be discriminated.

Figure 7:
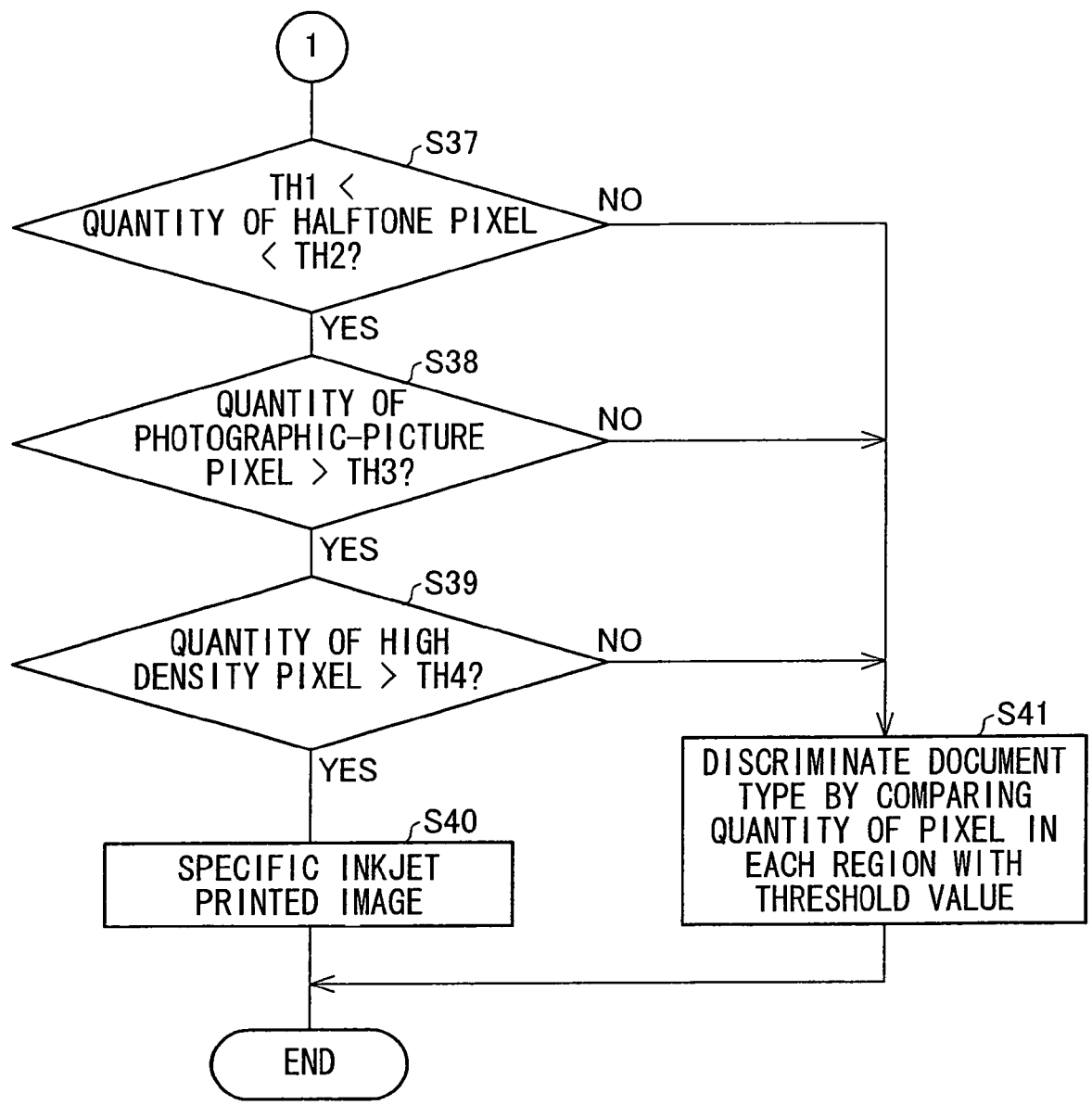
FIG. 7 is a flow chart illustrating a flow in a process carried out by the document type automatic discrimination section in FIG. 1. In the process, a specific inkjet printed image is discriminated without discriminating a printed-picture document and a photographic-picture document.

Concretely, immediately after S16 in FIG. 5, the quantity of the halftone pixels is determined in S37 in FIG. 7. The determination process here is the same as S20 in FIG. 6. Processes of S38 to S41 are the same processes as the ones of S21 to S24 in FIG. 6. Therefore, descriptions on the processes of S38 to S41 are omitted.

In a case where the document is classified as a specific inkjet printed image, the following processes are carried out in the color image processing apparatus 2 illustrated in FIG. 2, based upon a document type identification signal.

In the color correction section 16, likewise the photographic-picture, a color correction process is carried out so that no tone distortion occurs in a high density part. For example, the color correction table for the photographic-picture may be used.

In the black generation and under color removal section 17, quantities of black generation and under color removal are set in such a way that no tone distortion occurs in the dark part.

In the spatial filter process section 18, a smoothing process is carried out to the region partitioned into the halftone region (area coverage modulation) during the region partition process. Intensity of the smoothing process is set to be weaker than that of the printed-picture document. With respect to the region classified as a photographic-picture region, the intensity of a smoothing process is set to almost the same or more enhanced than that of the photographic-picture document to reduce a difference to the halftone region.

In the tone reproduction process section 20, a tone reproduction process in which emphasis is placed on tones is carried out in a similar manner as to the photographic-picture document. In other words, for example, in a dither process, the dither matrix size is enlarged, and in an error diffusion process, the diffusion matrix is enlarged.

The foregoing described a method of determining the document type. Instead of determining the document type, a control signal identifying a specific inkjet printed image may be outputted to the color correction section 16, the black generation and under color removal section 17, the spatial filter process section 18, and the tone reproduction process section 20.

As the control signal, one signal identifying a specific inkjet printed image may be outputted. Alternatively, signals respectively indicating the conditions of (d) to (f) below may be outputted, and the color correction section 16, the black generation and under color removal section 17, the spatial filter process section 18, and the tone reproduction process section 20 may calculate logical products of the respective signals so as to determine:

(d) a quantity of counted halftone pixel is not many (within a predetermined value range);
(e) a quantity of counted high density pixel is greater than a threshold value; and
(f) a quantity of counted photographic-paper pixels is greater than a threshold value.

Figure 8:
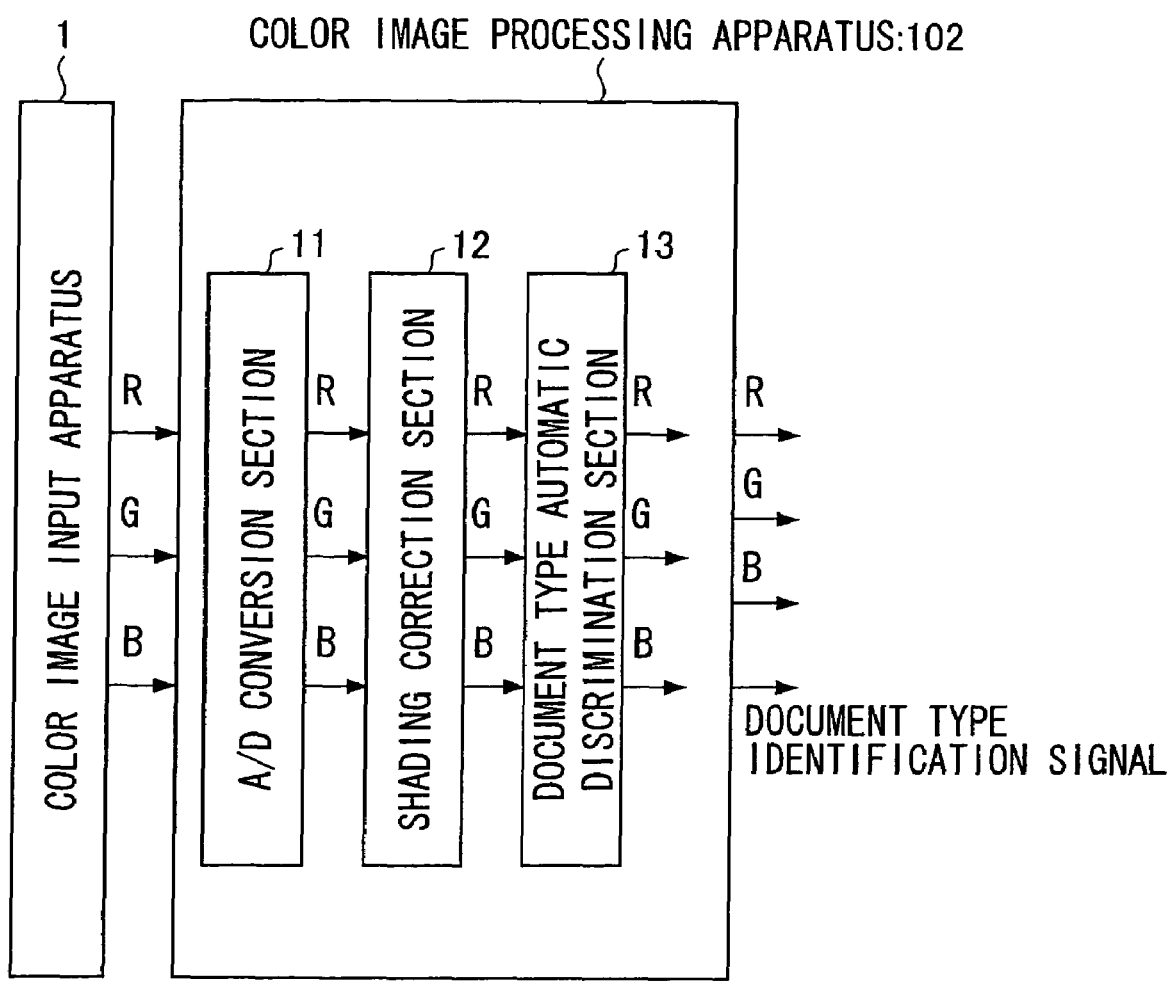
FIG. 8 is a block diagram illustrating a structure of a substantial part of an image reading apparatus including an image processing apparatus of an embodiment in the present invention.

FIG. 8 illustrates a structure of an image reading apparatus (flatbed scanner) including a color image processing apparatus 102 of the embodiment.

As illustrated in FIG. 8, the color image processing apparatus 102 includes an A/D conversion section 11, a shading correction section 12, and a document type automatic discrimination section 13. The color image input apparatus 1 is connected to the color image processing apparatus 102, so as to form an image reading apparatus as an aggregate.

The color image input apparatus 1 (image reading section) is constituted of a scanner section including, for example, a CCD (Charge Coupled Device), reads a reflected-light image from the document as an RGB (R: red, G: green, B: blue) analogue signal through the CCD, and inputs the image into the color image processing apparatus 102.

The analogue signal read by the color image input apparatus 1 is transmitted through the color image processing apparatus 102 in the order of the A/D conversion section 11, the shading correction section 12, and the document type automatic discrimination section 13. Then, the signal is outputted as an RGB digital color signal to, for example, a personal computer.

The A/D (analogue/digital) conversion section 11 converts an RGB analogue signal into a digital signal. The shading correction section 12 removes various distortions generated in a lighting system, an image formation system, and an image pickup system of the color image input apparatus 1, with respect to the digital RGB signal supplied from the A/D conversion section 11. The shading correction section 12 adjusts the color balance.

The document type automatic discrimination section 13 converts the RGB signal (RGB reflectivity signal) that the shading correction section processed so as to remove various distortions and adjust a color balance, into a signal, such as a density signal, that is easy for an image processing system employed in the color image processing apparatus 102. In addition, the document type automatic discrimination section 13 determines the document type by the method described above, and outputs a document type identification signal indicating the determination result.

The image data on which the processes described above are carried out is inputted to a computer or a printer. The foregoing processes are controlled by a CPU (Central Processing Unit, not illustrated).

In the First Embodiment, an exemplary case where a quantity of high density pixels is used as a parameter for discriminating the specific inkjet printed image was described. In the Second Embodiment below, an exemplary case where a halftone frequency is used as the parameter will be described.

Embodiment 2

The following describes another embodiment of the present invention.

Figure 9:
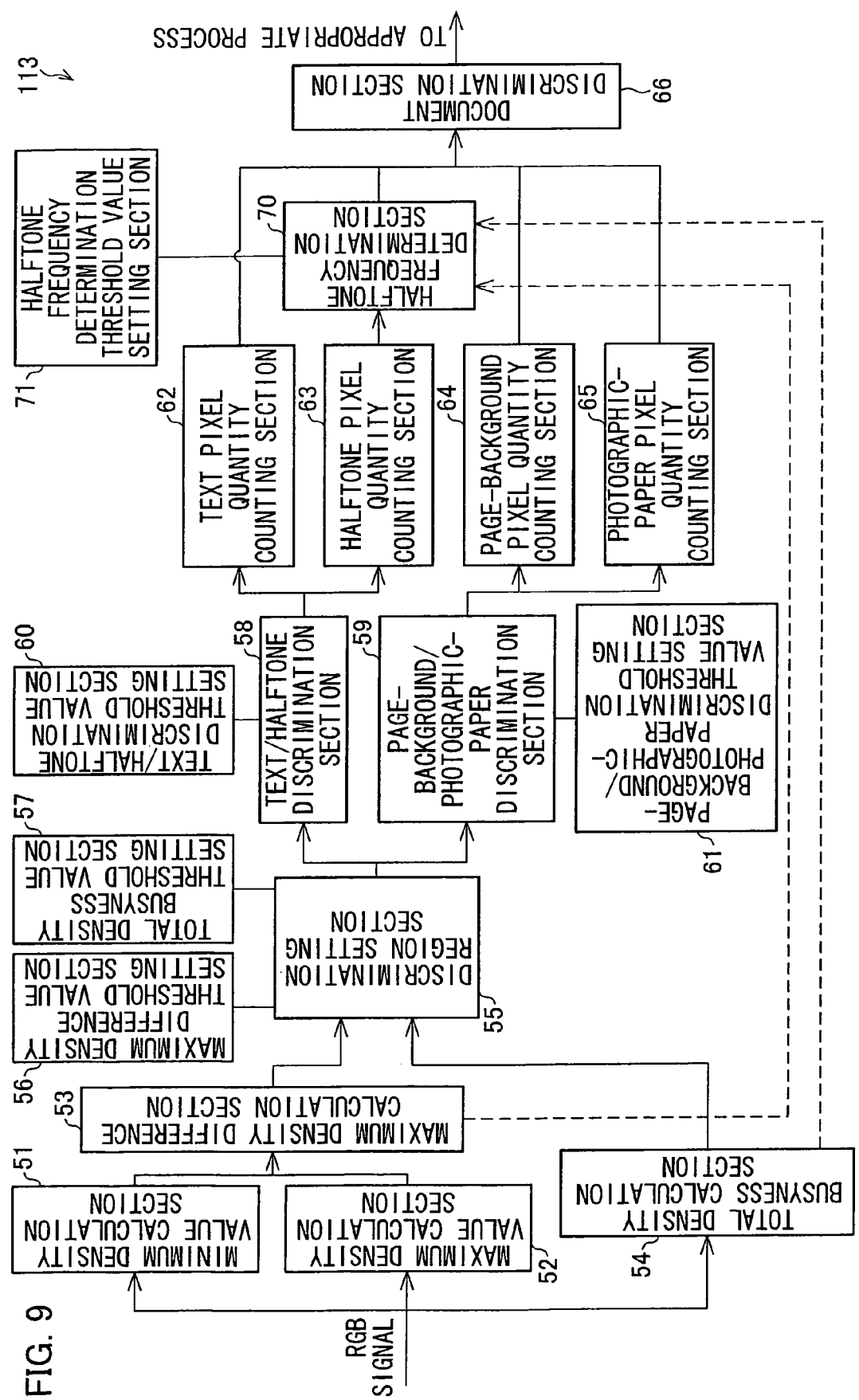
FIG. 9 is a block diagram illustrating a structure of a substantial part of a document type automatic discrimination section included in an image processing apparatus of another embodiment of the present invention.

In the embodiment, in place of the document type automatic discrimination section 13 of Embodiment 1 that is illustrated in FIG. 1, a document type automatic discrimination section 113 in FIG. 9 is employed.

The document type automatic discrimination section 113 includes a minimum density value calculation section 51, a maximum density value calculation section 52, a maximum density difference calculation section 53, a total density busyness calculation section 54, a discrimination region setting section 55, a text/halftone discrimination section 58, a page-background/photographic-paper discrimination section 59, a text pixel counting section 62, a halftone pixel counting section 63, a halftone frequency determination section 70, a page-background pixel counting section 64, a photographic-paper pixel counting section 65, and a document discrimination section 66.

The minimum density value calculation section 51 calculates a minimum density value of an n-by-m (for example, 15×15) block containing a target pixel. The maximum density value calculation section 52 calculates a maximum density value of the block. The maximum density difference calculation section (maximum density difference calculation section) 53 calculates a maximum density difference, based upon the minimum density value calculated by the minimum density value calculation section 51 and the maximum density value calculated by the maximum density value calculation section 52.

The total density busyness calculation section 54 calculates a total density busyness by figuring out the sum of absolute values of density differences between adjoining pixels in the block.

The discrimination region setting section 55 classifies the block into a page-background region/photographic-paper region or a text region/halftone region by comparing the maximum density difference calculated by the maximum density difference calculation section 53 with a corresponding threshold value, and the minimum density busyness calculated by the total density busyness calculation section 54 with a corresponding threshold value. Specifically, the discrimination region setting section 55 compares the maximum density difference and the total density busyness with respective threshold values so as to determine which one of the page-background region/photographic-paper region and the text region/halftone region the target pixel belongs to.

The text/halftone discrimination section 58 classifies the target pixel classified as a pixel belonging to the text/halftone region by the discrimination region setting section 55 either as a pixel belonging to the text region or a pixel belonging to the halftone region (determines which one of the text region or the halftone region the target pixel belongs to). The page-background/photographic-paper discrimination section 59 classifies the target pixel classified as a pixel belonging to the page-background/photographic-paper region by the discrimination region setting section 55 as a pixel belonging to the page-background region or a pixel belonging to the photographic-paper region (determines which one of the page-background region or the photographic-paper region the target pixel belongs to).

The text pixel counting section 62 counts a quantity of pixels classified as a pixel belonging to the text region by the text/halftone discrimination section 58.

The halftone pixel counting section 63 counts a quantity of pixels classified as a pixel belonging to the halftone region by the text/halftone discrimination section 58. In other words, the halftone pixel counting section 63 counts a quantity of pixels belonging to the halftone image region in the image read from the color image input apparatus 1.

The page-background pixel counting section 64 counts a quantity of pixels classified as a pixel belonging to the page-background region by the page-background/photographic-paper discrimination section 59. The photographic-paper pixel counting section 65 counts a quantity of pixels classified as a pixel belonging to the photographic-paper region by the page-background/photographic-paper discrimination section 59.

The halftone frequency determination section (halftone frequency range determination section) 70 determines halftone frequencies (unit: line per inch) with respect to an n-by-m block containing a target pixel classified as a halftone. In addition, the halftone frequency determination section 70 determines a range of halftone frequencies as a parameter indicating a deviation of a distance between dots in the document. It can be also said that the range of halftone frequencies is a parameter indicating a deviation of a halftone frequency in the document.

The document discrimination section 66 determines the document type, based upon respective results of counting a quantity of pixels belonging to each region by respective counting sections 62, 63, 64, and 65, and results of determination and calculation by the halftone frequency determination section 70.

Further, the discrimination region setting section 55 includes a maximum density difference threshold value setting section 56 and a total density busyness threshold value setting section 57. The maximum density difference threshold value setting section 56 sets a maximum density difference threshold value used for determining which one of the page-background region/photographic-paper region and the text region/halftone region the target pixel belongs to, based upon a calculation result by the maximum density difference calculation section 53. The total density busyness threshold value setting section 57 sets a total density busyness threshold value used for determining which one of the page-background region, photographic-paper region, or the text region/halftone region the target pixel belongs to, based upon a calculation result by the total density busyness calculation section 54.

The text/halftone discrimination section 58 includes a text/halftone discrimination threshold value setting section 60 that sets a text/halftone determination threshold value used for determining which one of the text region and the halftone region the target pixel belongs to. The page-background/photographic-paper discrimination section 59 includes a page-background/photographic-paper discrimination value setting section 71 that sets a page-background/photographic-paper determination threshold value used for determining which one of the page-background region and the photographic-paper region the target pixel belongs to. The halftone frequency determination section 70 includes a halftone frequency determination threshold value setting section 71 that sets a halftone frequency determination threshold value used for determining halftone frequencies.

The rest of the sections besides the halftone frequency determination section 70 and the halftone frequency determination threshold value setting section 71 are the same as the sections in the document type automatic discrimination section 13 of the First Embodiment.

The following describes an exemplary determination of halftone frequencies and a range of halftone frequencies by the halftone frequency determination section 70, with reference to FIGS. 10(a) and 10(b).

With respect to the target pixel classified as a pixel belonging to the halftone pixel, the halftone frequency determination section 70 divides the total density busyness calculated by the total density busyness calculation section 54 by the maximum density value calculated by the maximum density difference calculation section 53, and figures out a value (the value will be simply referred to as an "pixel transition number", hereinafter) that functions as an index of the pixel transition number (number of times that the density between adjoining pixels changes from a low density and to a high density, and from a high density to a low density) in the m-by-n block containing the target pixel, so as to create a histogram showing a relationship between the pixel transition number and the quantity of target pixels (see FIG. 10). From the point of view of facilitation of hardware, the histogram may be divided every certain pixel transition number.

As illustrated in FIG. 3(c) described in the First Embodiment, in the halftone region a spot where a halftone pixel exists shows a maximum density value. A total density busyness is added for each halftone pixel. Accordingly, by dividing the total density busyness by the maximum density value, the pixel transition number in the m-by-n block containing the target pixel can be figured out.

Further, a pixel with a large pixel transition number can be determined as a high frequency halftone, and a pixel with small pixel transition number can be determined as a low frequency halftone. Therefore, by comparing the pixel transition number figured out as described above with a halftone frequency determination threshold value, the halftone frequency determination section 70 can determine the halftone frequency in the m-by-n block containing the target pixel.

Further, the halftone frequency determination section 70 calculates the range of halftone frequencies based upon the created histogram. The following describes the calculation in detail.

The range of halftone frequencies is a parameter indicating a criterion of deviation in ranges between halftones in the document image (degree of variation), and is indicated with the distribution range of the pixel transition numbers in the histogram in FIGS. 10(a) and 10(b).

The lower the deviation in the range between halftones in the document image is, the lower deviation in the values of the pixel transition number calculated for each target pixel (that is, the halftone frequency). Therefore, the range in the histogram becomes narrow. On the other hand, the higher the deviation in the range between halftones in the document image is, the higher the deviation in the values of the pixel transition number calculated for each target pixel (that is, the halftone frequency). Therefore, the range in the histogram becomes wide.

Therefore, by creating a histogram as illustrated in FIGS. 10(a) and 10(b), and figuring out (calculating) the distribution range of the pixel transition numbers in the histogram as the range of halftone frequencies, the halftone frequency determination section 70 can determine the criterion of deviation in the range between halftones in the document image, based upon the range of halftone frequencies. Concretely, when the range of halftone frequencies is large (the distribution range of the pixel transition numbers is wide), the deviation in the range between halftones in the document image is high. On the other hand, when the range of halftone frequencies is small (the distribution range of the pixel transition numbers is narrow), the deviation in the range of halftones in the document image is low.

The following describes a relationship between the range of halftone frequencies (the distribution range of the pixel transition numbers) and the document type. In the print (halftone) document (printed-picture), usually, one single halftone frequency is used. Therefore, as illustrated in FIG. 10(a), a histogram with a narrow distribution range of pixel transition numbers within a certain value range of pixel transition numbers.

In contrast, with respect to the inkjet printer document, because of its characteristics of (g) to (k) below, a histogram with a wide distribution range of pixel transition numbers is created, as illustrated in FIG. 10(b):

(g) The error diffusion method or the blue-noise mask method are often used as a tone reproduction method (see, for example, Journal of the Imaging Society of Japan, Vol. 40, No. 3 (2001), pp. 237-243);

(h) in the above method, darkness and lightness are reproduced with an area coverage modulation, and it is not possible to reproduce darkness and lightness with dots. The tone is reproduced by changing the quantity of dots and pattern shapes. A distance between dots becomes less from a low density region to a high density region, and dots are integrated. Therefore, the pixel transition number significantly differs depending upon the density;

(i) the resolution may differ in a lateral direction of the document (direction parallel to the direction in which the inkjet head moves) and in a longitudinal direction (direction perpendicular to the direction in which the inkjet head moves), and the pixel transition numbers differ in the longitudinal direction and in the lateral direction;

(j) an inkjet printer controls dots with an amount of ink (for example, a multi-dropped method), and as the dots enlarge, the pixel transition number in a certain mask decreases; and (k) in a case where the image is formed with higher resolution than the resolution of the image input apparatus, for example, in a case where the image is formed with a resolution of 2880 dpi (dot per inch) by an image input apparatus with a resolution of 600 dpi, it is difficult to read each single dot. Therefore, the pixel transition number tends to deviate.

Due to the reasons described above, in the histogram of the pixel transition number in the inkjet printed image, the distribution range of pixel transition numbers is wide, and the range of halftone frequencies is large, as illustrated in FIG. 8(b).

Therefore, the document discrimination section 36 can determine whether the document is the print document or the inkjet printed image, based upon the range of histogram calculated by the halftone frequency determination section 70, in other words, the range of halftone frequencies (distribution range of pixel transition numbers)

Figure 11:
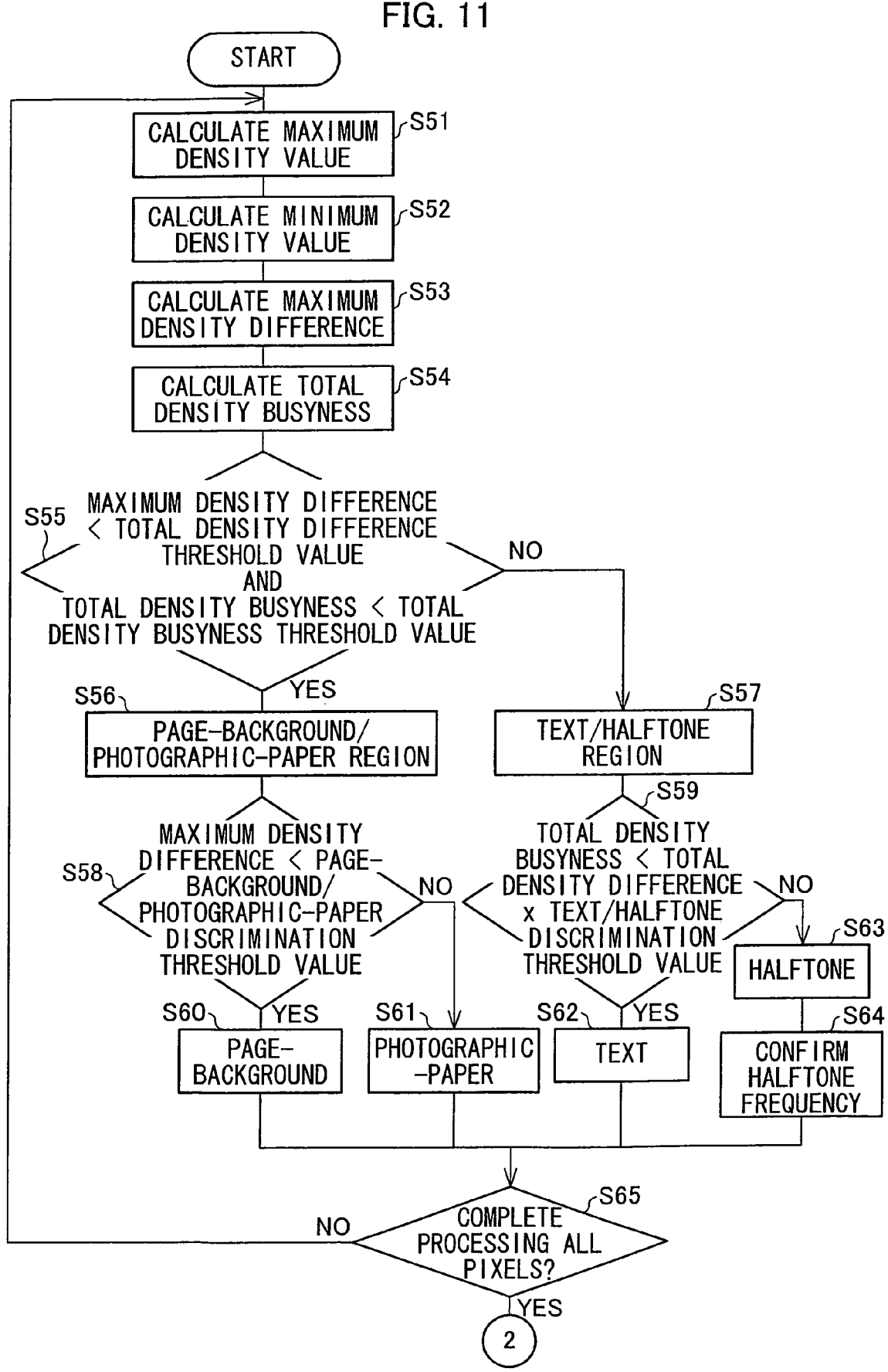
FIG. 11 is a flow chart illustrating a part of a flow in a document type discrimination process carried out by a document type automatic discrimination section in FIG. 9.

The following describes a flow of the process in the document type automatic discrimination section 113, with reference to the flow chart in FIG. 11.

In the flow chart in FIG. 11, processes S51 to S63 are the same as the processes of S1 to S13 illustrated in the flow chart in FIG. 5. The only difference is that a process for determining the halftone frequency (S64) is added after the process of S63.

In other words, in S64, the halftone frequency in the region classified as the halftone region in S63 is determined.

Figure 12:
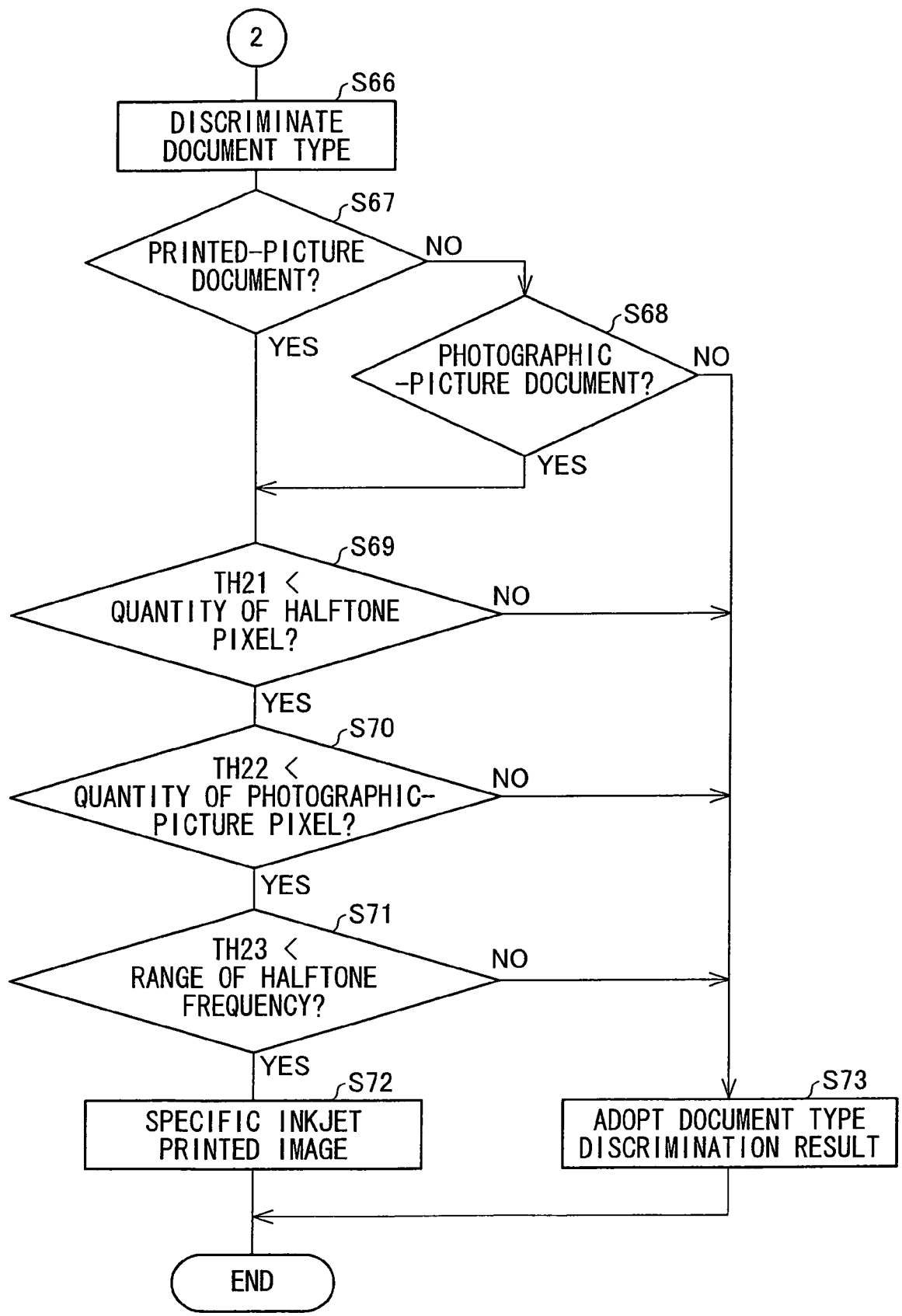
FIG. 12 is a flow chart illustrating a flow in a process carried out by the document type automatic discrimination section in FIG. 9. In the process, a printed-picture document and a photographic-picture document are first discriminated, and then a specific inkjet printed image is discriminated.

Then, in S65, it is determined whether processes to all pixels have been completed. If the processes have not been completed, yet, the process moves to S51. If the processes have already been completed, a process for discriminating the specific inkjet printed image that is illustrated in FIG. 12 is carried out.

The followings are parameters and conditions for discriminating a specific inkjet printed image:

(l) the quantity of counted halftone pixels is equal to or greater than the threshold value;

(m) the quantity of counted photographic-paper pixels is equal to or greater than the threshold value; and (n) the range of halftone frequencies is equal to or greater than the threshold value.

A formula for discrimination may be set based upon these three parameters and conditions, or the discrimination may be carried out with a look-up table of a combination of these three parameters and conditions.

As illustrated in FIGS. 10(a) and 10(b), in embodiment, a total of categories in which a degree of histogram of the pixel transition number is detected is named as a distribution range of pixel transition numbers, in other words, a range of halftone frequencies.

The following describes a flow of the process of discriminating the specific inkjet printed image using the above conditions, with reference to the flow chart in FIG. 12.

In the following description, a quantity of halftone pixels, and a quantity of photographic-paper pixels are indicated as Cs and Cp, respectively, and the halftone frequency range is indicated as Ws.

First of all, the document discrimination section 66 determines the document type, based upon information (quantity of page-background pixels, quantity of photographic-paper pixels, quantity of text pixels, quantity of halftone pixels) obtained through processes illustrated in the flow chart in FIG. 11 (S66).

Then, the document discrimination section 66 determines whether the document type determined in S66 is the printed-picture document (S67). When determining that the document type is not the printed-picture document, the document discrimination section 66 moves the process to S68. When determining that the document type is the printed-picture document, the document discrimination section 66 moves the process to S69.

In S68, the document discrimination section 66 determines whether the document type determined in S66 is the photographic-picture document. When determining that the document type is the photographic-picture document, the document discrimination section 66 moves the process to S69. When determining that the document type is not the photographic-picture document, the document discrimination section 66 moves the process to S73, and a result determined in S66 is adopted as the determination result of the document type.

In S69, the document discrimination section 66 determines whether a predetermined quantity of halftone pixel exists, based upon the conditional formula (ε) below:

$$TH21 < Cs \qquad (\epsilon).$$

In a case where the conditional formula is not satisfied, the document discrimination section 66 moves the process to S73, and the result determined in S66 is adopted as a determination result of the document type.

The threshold value TH21 is a threshold value for identifying a photographic-picture document and a specific inkjet printed image. The threshold value TH21 indicates the minimum quantity of counted halftones, below which the specific inkjet printed image is not to be classified as a photographic-picture document. For the threshold value TH21, for example, a value of approximately 3% to 5% of pixels in the entire image is assigned to TH21.

Then, in S70, the document discrimination section 66 determines whether a quantity of the photographic-picture document pixels is equal to or more than a predetermined quantity, based upon the conditional formula (ζ) below. The printed-picture document hardly contains a pixel determined as a pixel belonging to the photographic-paper document, but the specific inkjet printed image contains no small quantity of pixels classified as a pixel belonging to the photographic-paper document. The process determines this characteristic.

$$TH22 < Cp \qquad (\zeta).$$

In a case where the conditional formula (ζ) is not satisfied, the document discrimination section 66 moves the process to S73, and the result determined in S66 is adopted as a determination result of document type.

The threshold value TH22 is a threshold value for identifying a printed-picture document containing a small halftone portion and the specific inkjet printed image. The threshold value TH22 indicates the minimum quantity of counted photographic-paper pixels, below which the specific inkjet printed image is not to be classified as a printed-picture document. For the threshold value TH22, for example, a value of approximately 2% to 5% of pixels in the entire image is assigned to TH22.

Then, in S71, the document discrimination section 66 determines whether the halftone frequency in the document image deviates, based upon the conditional formula (η) below. Because the printed-picture document is printed out at a constant halftone frequency, halftones do not deviate, and therefore the range of halftone frequencies is small. With respect to the inkjet printed image, due to the reasons described above, the pixel transition number tends to deviate. Therefore, the range of halftone frequencies is large (the halftone frequency deviates less).

$$TH23 < Ws \qquad (\eta).$$

In a case where the conditional formula (η) is not satisfied, the document discrimination section 66 moves the process to S73, and a result determined in S66 is adopted as the determination result of the document type.

The threshold value TH23 indicates an ordinary maximum range of halftone frequencies in the printed-picture document. For the threshold value TH23, for example assuming that the block is a 15×15 block and the number of categories in the histogram is 15, a value of approximately 2 is assigned.

In the above process, the document type is identified, and the process of discriminating the specific inkjet printed image is carried out only when the document type is determined as the "photo document" or the "printed-picture document". In this case, regardless of whether a fact the document contains or does not contain a text, the process to be carried out remains the same. Therefore, only the photographic-picture document and the printed-picture document are described. The "printed-picture document" may be replaced with a "printed-picture document or picture-picture document".

Further, instead of determining the document type first, as described above, the processes of S69-S71 may be carried out immediately after the pixels are classified as a pixel belonging to the page-background region, the photographic-paper region, the text region, and the halftone region.

Figure 13:
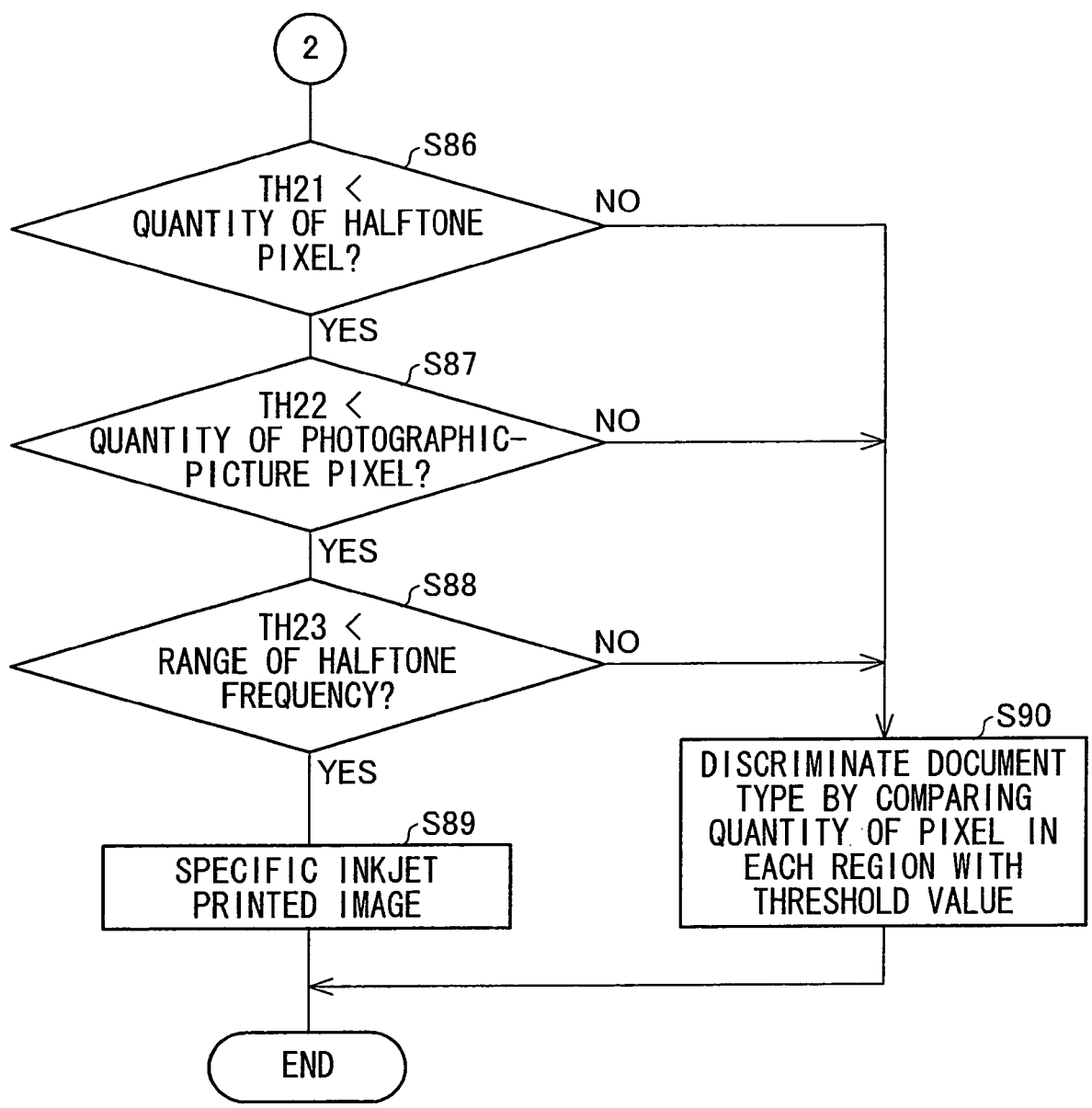
FIG. 13 is a flow chart illustrating a flow in a process carried out by the document type automatic discrimination section in FIG. 9. In the process, a specific inkjet printed image is discriminated without discriminating a printed-picture document and a photographic-picture document.

Concretely, immediately after S16 in FIG. 11, a quantity of halftone pixels is determined in S86 in FIG. 13. The determination process here is the same as S69 in FIG. 12. Processes of S87-S90 are the same as the processes of S70-S73 in FIG. 12. Therefore, description of S87-S90 is omitted.

The Second Embodiment describes an exemplary case where the range of halftone frequencies is used as the parameter for discriminating the specific inkjet printed image. The First Embodiment describes an exemplary case where the quantity of high density pixels is used as the parameter for discriminating the specific inkjet printed image. The Third Embodiment below will describe an exemplary case where both the quantity of high density pixels and the range of halftone frequencies are used as the parameters for discriminating the specific inkjet printed image.

Third Embodiment

The following describes another embodiment of the present invention.

Figure 14:
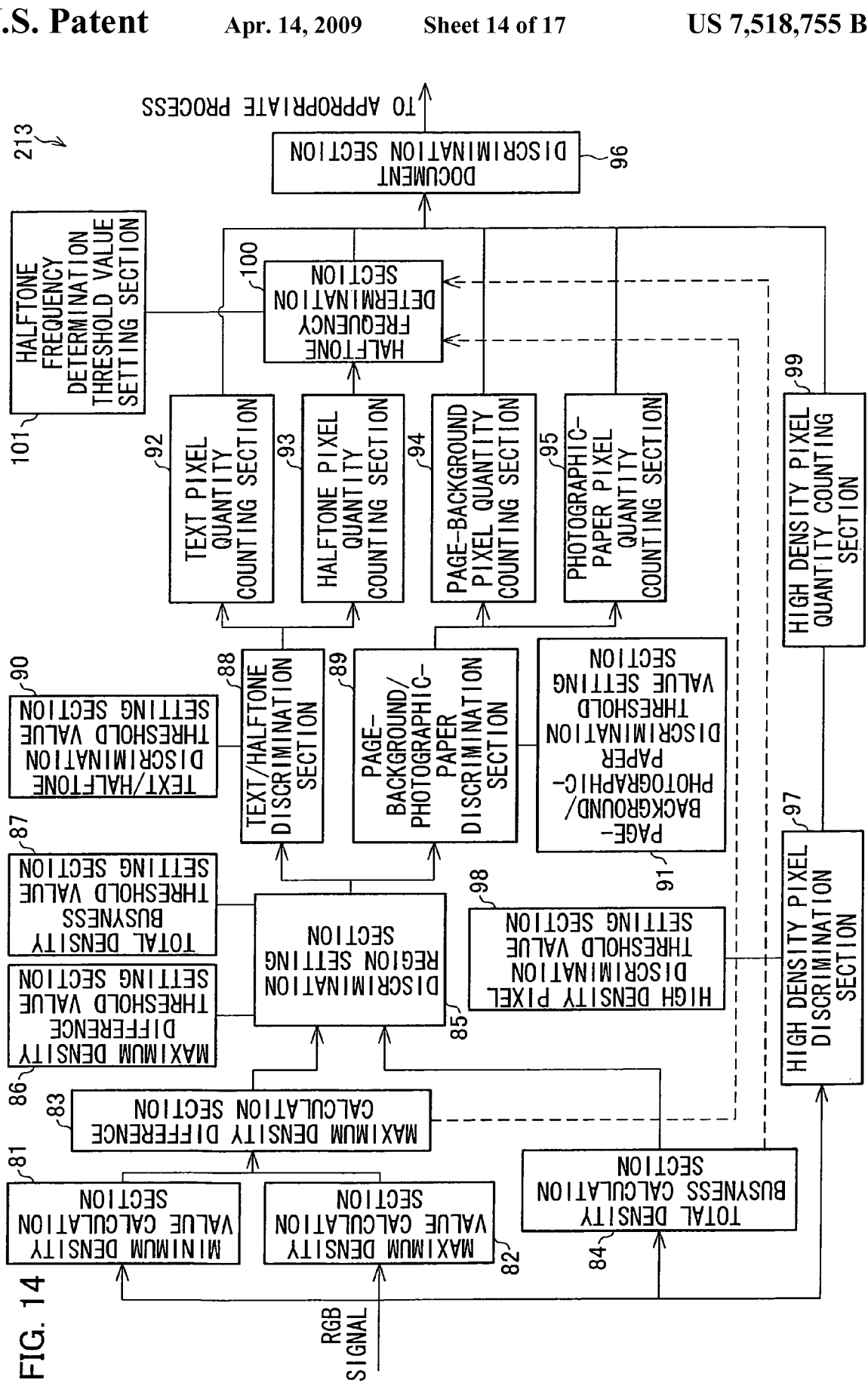
FIG. 14 is a block diagram illustrating a structure of a substantial part of a document type automatic discrimination section included in an image processing apparatus of another embodiment of the present invention.

In the Embodiment, a document type automatic discrimination section 213 illustrated in FIG. 14 is employed in place of the document automatic discrimination section 13 illustrated in FIG. 1 of the First Embodiment.

The document type automatic discrimination section 213 includes a minimum density value calculation section 81, a maximum density value calculation section 82, a maximum density difference calculation section 83, a total density busyness calculation section 84, a discrimination region setting section 85, a text/halftone discrimination section 88, a page-background/photographic-paper discrimination section 89, a high density pixel discrimination section 97, a text pixel counting section 92, a halftone pixel counting section 93, a high density pixel counting section 99, a halftone frequency determination section 100, a page-background pixel counting section 94, a photographic-paper pixel counting section 95, and a document discrimination section 96.

The minimum density value calculation section 81 calculates a minimum density value in an n-by-m (for example, 15×15) block containing a target pixel. The maximum density value calculation section 82 calculates a maximum density value in the block.

The maximum density difference calculation section 83 calculates a maximum density difference based upon the minimum density value calculated by the minimum density value calculation section 81 and the maximum density value calculated by the maximum density value calculation section 82. The total density busyness calculation section 84 calculates a total density busyness by figuring out the sum of absolute values of density differences between adjoining pixels in the block.

The discrimination region setting section 85 partitions a page-background region/photographic-paper region and a text region/halftone region by comparing the maximum density difference calculated by the maximum density difference calculation section 83 and the total density busyness calculated by the total density busyness calculation section 84 with respective threshold values. Specifically, the discrimination region setting section 85 compares the maximum density difference and the total density busyness with the respective threshold values, so as to determine which one of the page-background region/photographic-paper region or the text region/halftone region the target pixel belongs to.

The text/halftone discrimination section 88 determines whether the pixel classified as a pixel belonging to the text/halftone region by the discrimination region setting section 85 is a text or a halftone (the text/halftone discrimination section 88 determines whether the target pixel is a pixel belonging to the text region or a pixel belonging to the halftone region). The page-background/photographic-paper discrimination section 89 determines whether the pixel classified as a pixel belonging to the page-background region/photographic-paper region by the discrimination region setting section 85 is a pixel belonging to the page-background region or a pixel belonging to the photographic-paper region (the page-background/photographic-paper discrimination section 89 determines whether the target pixel is a pixel belonging to the page-background region or a pixel belonging to the photographic-paper region).

The high density pixel discrimination section 97 determines whether the target pixel is a pixel belonging to the high density region.

The text pixel counting section 92 counts a quantity of pixels classified as a pixel belonging to the text region by the text/halftone discrimination section 88. The halftone pixel counting section 93 counts a quantity of pixels classified as a pixel belonging to the halftone region by the text/halftone discrimination section 88. The page-background pixel counting section 94 counts a quantity of pixels classified as a pixel belonging to the page-background region by the page-background/photographic-paper discrimination section 89. The photographic-paper pixel counting section 95 counts a quantity of pixels classified as a pixel belonging to the photographic-paper region by the page-background/photographic-paper discrimination section 89. The high density pixel counting section 99 counts a quantity of pixels classified as a pixel belonging to the high density pixel by the high density pixel discrimination section 97.

The halftone frequency determination section (halftone frequency range determination section) 100 determines halftone frequencies with respect to a n-by-m block containing the target pixel classified as a pixel belonging to the halftone region In addition, the halftone frequency determination section 100 calculates a range of halftone frequencies in the document image.

The document discrimination section 96 determines the document type, based upon results of counting pixels belonging to the respective regions by the respective counting sections 92, 93, 94, 95, and 99, and a result of determination and calculation by the halftone frequency determination section 100.

Further, the discrimination region setting section 85 includes a maximum density difference threshold value setting section 86, and a total density busyness threshold value setting section 87. The maximum density difference threshold value setting section 86 sets a maximum density difference threshold value used for determining whether the target pixel is a pixel belonging to the page-background region/photographic-paper region or a pixel belonging to the text region/halftone region based upon a result calculated by the maximum density difference calculation section 83. The total density busyness threshold value setting section 87 sets a total density busyness threshold value used for determining whether the target pixel is a pixel belonging to the page-background region/photographic-paper region or a pixel belonging to the text region/halftone region based upon a result calculated by the total density busyness calculation section 84.

The text/halftone discrimination section 88 includes a text/halftone discrimination threshold value setting section 90 that sets a text/halftone determination threshold value used for determining whether the target pixel is a pixel belonging to the text region or a pixel belonging to the halftone region The page-background/photographic-paper discrimination section 89 includes a page-background/photographic-paper discrimination value setting section 91 that sets a page-background/photographic-paper determination threshold value used for determining whether the target pixel is a pixel belonging to the page-background region or a pixel belonging to the photographic-paper region.

Further, the high density pixel discrimination section 97 includes a high density pixel discrimination threshold value setting section 98 that sets a high density pixel determination threshold value used for determining whether the target pixel is a pixel belonging to the high density region.

Further, the halftone frequency determination section 100 includes a halftone frequency determination threshold value setting section 101 that sets a halftone frequency determination threshold value used for determining halftone frequencies or a range of halftone frequencies.

The rest of the sections other than the high density pixel discrimination section 97, the high density pixel discrimination threshold value setting section 98, the halftone frequency determination section 100, the halftone frequency determination threshold value setting section 101, are the same as the sections in the document type automatic discrimination section 13 of the First Embodiment.

The high density pixel discrimination section 97 and the high density pixel discrimination threshold value setting section 98 are the same sections as the high density pixel discrimination section 37 and the high density pixel discrimination threshold value setting section 38 of the First Embodiment. The halftone frequency determination section 100 and the halftone frequency determination threshold value setting section 101 are the same sections as the halftone frequency determination section 70 and the halftone frequency determination threshold value setting section 71 of the Second Embodiment.

Figure 15:
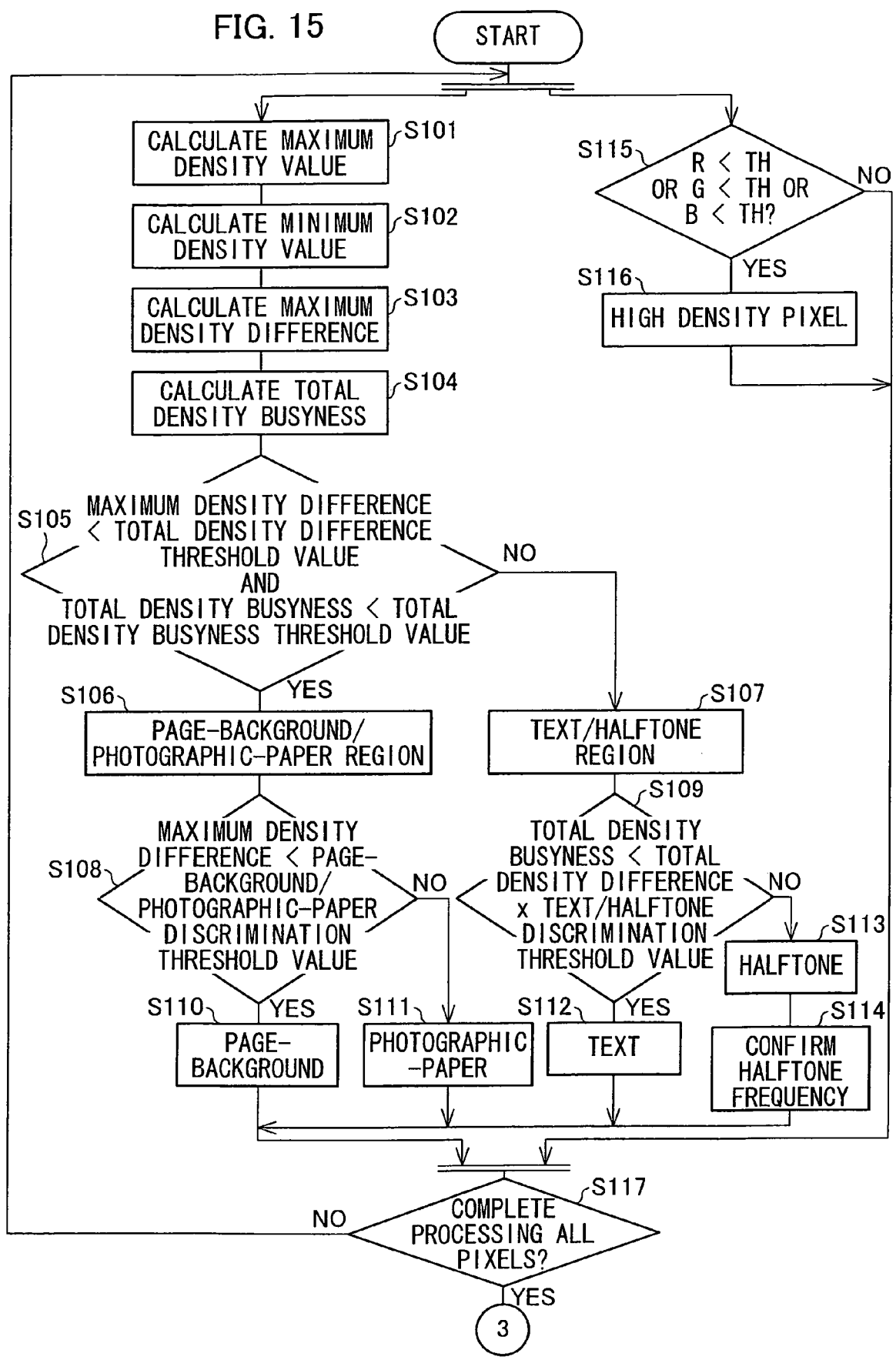
FIG. 15 is a flow chart illustrating a part of a flow in a document type discrimination process carried out by the document type automatic discrimination section in FIG. 14.

The following describes a flow of processes in the document type automatic discrimination section 213, with reference to the flow chart in FIG. 15.

In the flow chart in FIG. 15, processes S101 to S114 are the same processes as the ones of S51 to S64 in the flow chart in FIG. 11 of the Second Embodiment, and processes S115 to S117 are the same processes as the ones of S14 to S16 in the flow chart in FIG. 5 of the First Embodiment.

Figure 16:
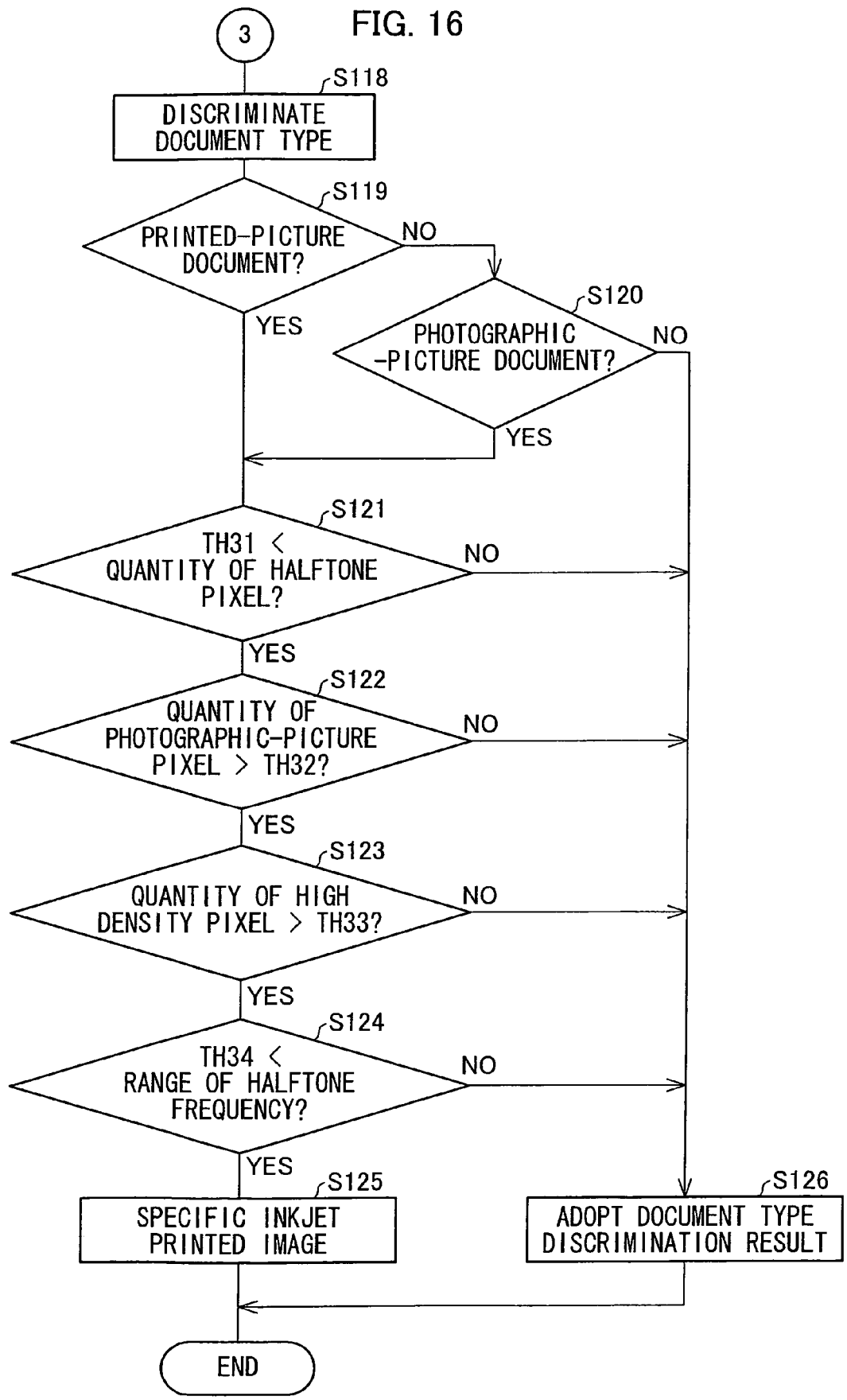
FIG. 16 is a flow chart illustrating a flow in a process carried out by the document type automatic discrimination section in FIG. 14. In the process, a printed-picture document and a photographic-picture document are first discriminated, and then a specific inkjet printed image is discriminated.

In the flow chart in FIG. 15, it is determined in S117 whether processes on all pixels have been completed. If the processes have not been completed, yet, the process moves to S101 and S115. If the processes have already been completed, a process for discriminating the specific inkjet printed image in FIG. 16 is carried out.

A parameter and a condition for discriminating a specific inkjet printed image are:

(o) the quantity of counted halftone pixels is equal to or greater than the threshold value;
(p) the quantity of counted photographic-paper pixels is equal to or greater than the threshold value;
(q) the quantity of counted high density pixels is equal to or greater than the threshold value; and
(r) the range of halftone frequencies is equal to or greater than the threshold value.

A formula for discrimination may be set based upon these four parameters, or the discrimination may be carried out with a look-up table of a combination of the parameters.

Figure 10:
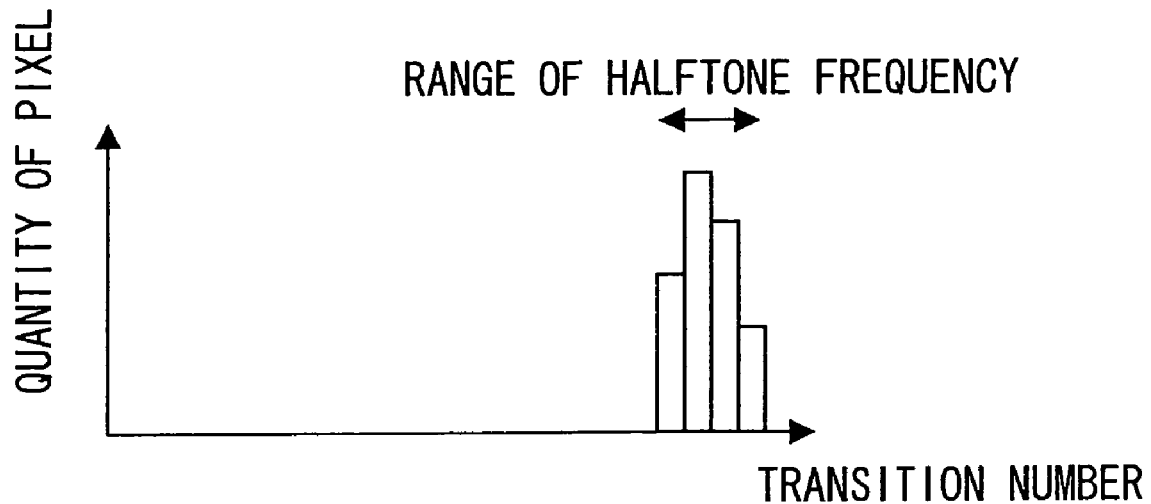
FIG. 10($a$) is a histogram showing a relationship between a pixel transition number and a quantity of pixels in a print document.
Figure 10:
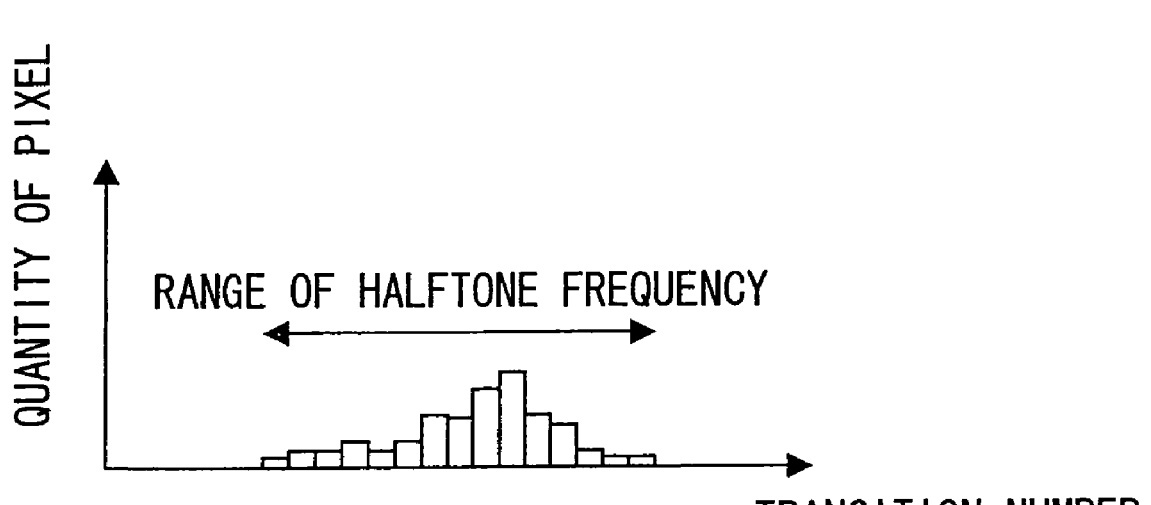

As illustrated in FIGS. 10(*a*) and 10(*b*), in Embodiment, a total of categories in which a degree of histogram of the pixel transition number is detected is named as a range of halftone frequencies.

The following describes a flow of process for discriminating a specific inkjet printed image using the above condition, with reference to the flow chart in FIG. 16.

In the following description, a quantity of halftone pixels, a quantity of photographic-paper pixels, and a quantity of high density pixels are indicated as Cs, Cp, and Ch, respectively, and the halftone frequency range is indicated as Ws.

First of all, the document discrimination section 96 determines the document type, based upon information (quantity of page-background pixels, quantity of photographic-paper pixels, and quantity of text pixels) obtained through the processes illustrated in the flow chart in FIG. 15 (S118).

Then, the document discrimination section 96 determines whether the document type determined in S118 is the printed-picture document (S119). When determining that the document type is not the printed-picture document, the document discrimination section 96 moves the process to S120. When determining that the document type is the printed-picture document, document discrimination section 96 moves the process to S121.

In S120, the document discrimination section 96 determines whether the document type determined in S118 is the photographic-picture document. When determining that the document type is the photographic-picture document, the document discrimination section 96 moves the process to S121. When determining that the document type is not the photographic-picture document, the document discrimination section 96 moves the process to S126, and a result determined in S118 is adopted as the determination result of the document type.

In S121, the document discrimination section 96 determines whether a certain quantity of halftone pixels exists, in accordance with the conditional formula (θ) below:

$$TH31 < Cs \qquad (\theta).$$

In a case where the conditional formula (θ) is not satisfied, the document discrimination section 96 moves the process to S126, and a result determined in S118 is adopted as the determination result of the document type.

The threshold value TH31 is a threshold value for identifying the photographic-picture and the specific inkjet printed image. The threshold value TH31 indicates a minimum quantity of counted halftone pixels, below which the specific inkjet printed image is not to be classified as a photographic-picture document. For threshold value TH31, for example, a value of approximately 3% to 5% of pixels in the entire image is assigned to TH31.

In S122, the document discrimination section 96 determines whether a quantity of photographic-paper pixels that is equal to or greater than a predetermined quantity exist, in accordance with the conditional formula (ι) below. The printed-picture document contains few pixels determined as a pixel belonging to the photographic-paper document, but the specific inkjet printed image contains no small quantity of pixels determined as pixels belonging to the photographic-paper document. The process determines this characteristic.

$$TH32 < Cp \qquad (\iota).$$

In a case where the conditional formula (ι) is not satisfied, the document discrimination section 96 moves the process to S126, and a result determined in S118 is adopted as the determination result of the document type.

The threshold value TH32 is a threshold value for identifying the printed-picture document containing a small halftone portion and the specific inkjet printed image. The threshold value TH32 indicates the minimum quantity of counted photographic-paper pixels, below which the specific inkjet printed image is not to be classified as a printed-picture document. For the threshold value TH32, for example, a value of approximately 2% to 5% of pixels in the entire image is assigned to TH32.

Then, the document discrimination section 96 determines whether the document image contains a certain quantity of high density pixels, in accordance with the conditional formula (κ) below (S123):

$$TH33 < Ch \qquad (\kappa).$$

In a case where the conditional formula (κ) is not satisfied, the document discrimination section 96 moves the process to S126, and a result determined in S118 is adopted as the determination result of the document type.

The threshold value TH33 indicates a maximum quantity of high density pixels at which no deterioration in image quality would be observed when a tone distortion occurs. For the threshold value TH33, for example, a value of approximately 5% to 10% of pixels in the entire image is assigned.

In S124, the document discrimination section 96 determines whether the halftone frequency deviates in the document image, in accordance with the conditional formula (λ) below. Because the printed-picture document is printed out at a constant halftone frequency, halftones do not deviate, and therefore the range of halftone frequencies becomes narrow. As described above, in the inkjet printed image, deviation in the pixel transition number tends to occur. Therefore, the range of halftone frequencies becomes wide (range of halftone frequencies increases).

$$TH34 < Ws \quad (\lambda).$$

In a case where the conditional formula (λ) is not satisfied, the document discrimination section 96 moves the process to S126, and a result determined in S118 is adopted as the determination result of the document type.

The threshold value TH34 indicates a normal maximum range of halftone frequencies in the printed-picture document. For the threshold value TH34, for example, assuming that the block is a 15×15 pixel, and the number of categories of the histogram is 15, a value such as 2 is assigned.

In the above process, the document type is determined first, and the process of discriminating a specific inkjet printed image is carried out only when the document type is determined as the "photo document" or the "printed-picture document". In this case, regardless a fact the document contains or does not contain a text, the process to be carried out remains the same. Therefore, only the photographic-picture document and printed-picture document are described. The "printed-picture document" may be replaced with a "printed-picture document or text/printed-picture document".

Further, instead of determining the document type first, as described above, the processes of S121 to S124 may be carried out immediately after the pixels are classified as a pixel belonging to the page-background region the photographic-paper region the text region and the halftone region.

Figure 17:
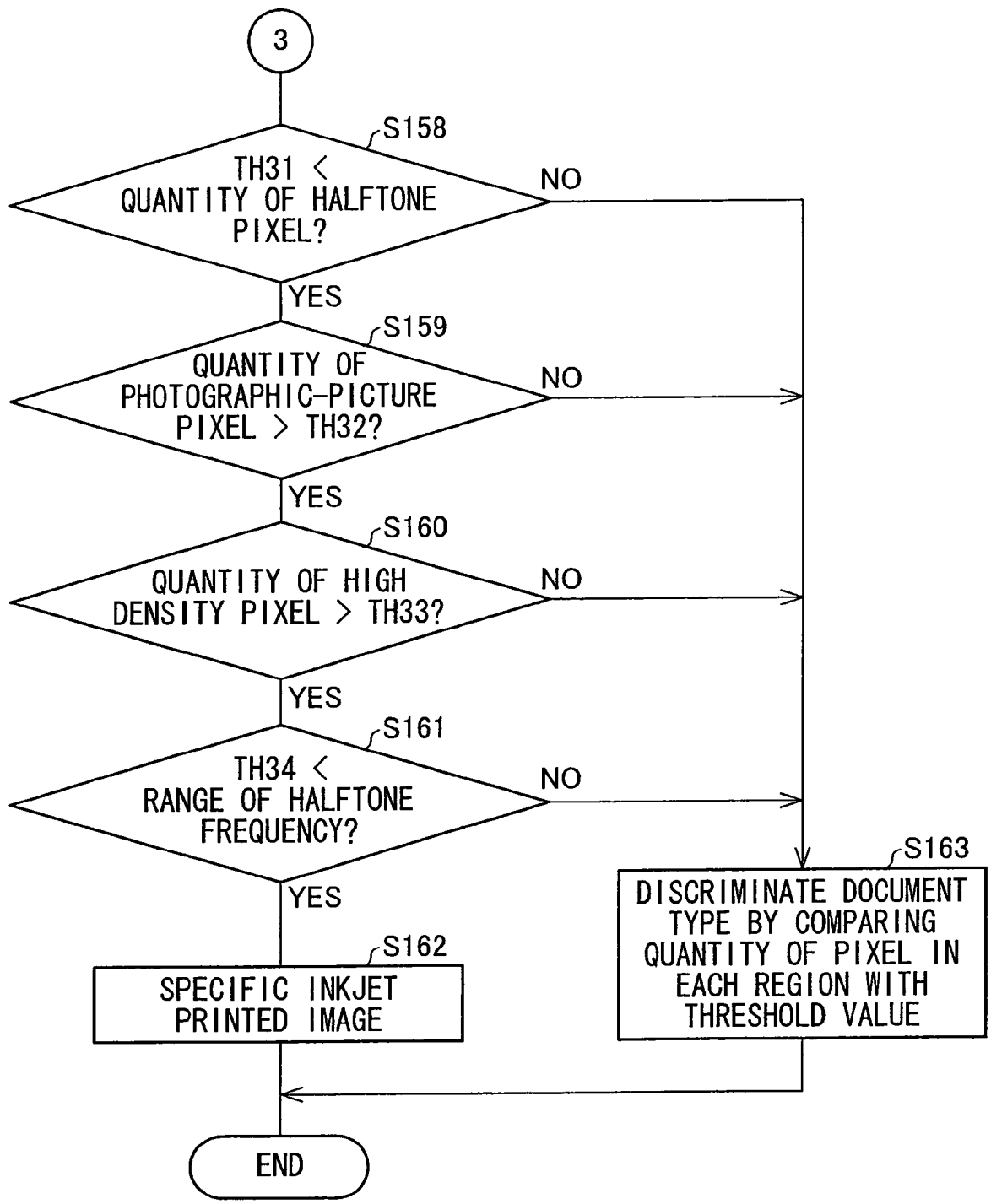
FIG. 17 is a flow chart illustrating a flow in a process carried out by the document type automatic discrimination section in FIG. 14. In the process, a specific inkjet printed image is discriminated without discriminating a printed-picture document and a photographic-picture document.

Concretely, immediately after S117 in FIG. 15, a quantity of halftone pixels is determined in S158 in FIG. 17. The determination process here is the same as S121 in FIG. 16. Processes of S159 to S161 are the same as the processes of S122 to S124 in FIG. 16. Therefore, description of S159 to S161 is omitted.

As described above, in the First Embodiment, the quantity of high density pixels is used as the parameter for discriminating a specific inkjet printed image. In this case, if the contrast is clear, the specific inkjet printed image can be appropriately discriminated, but if the contrast is unclear, the specific inkjet printed image may not be appropriately discriminated.

On the other hand, in the Second Embodiment, because the halftone frequency is used as the parameter for discriminating a specific inkjet printed image, a document without difference in halftone frequency (document typified by an office document), such as a graph, may be erroneously discriminated. However, if the document is with a difference in the halftone frequency but without clear contrast, the document can still be appropriately discriminated.

Therefore, as in the Third Embodiment, by using both the quantity of high density pixels and the halftone frequencies as the parameters for discriminating the specific inkjet printed image, demerits of both parameters can be compensated for each other. Therefore, the document type can be highly accurately discriminated.

An image processing apparatus of the present invention includes a document type automatic discrimination section that, based upon input image data read from a document, automatically discriminates a document type of the document. In order to solve the above problems, the image processing apparatus is characterized in that the document type automatic discrimination section, based upon plural types of parameters that are obtained from plural types of characteristics extracted from the input image data and which parameters are used for discriminating a document type, discriminates a specific inkjet printed image whose output image data would not reach a standard level, if a process for a halftone reproduction region or a process for a continuous tone region were to be carried out on the input image data.

In the above structure, only an inkjet printed image that cannot be finely reproduced in a conventional image mode (process to the printed-picture document, process to the photographic-picture document) is discriminated, instead of discriminating all inkjet printed images, thereby improving accuracy of discrimination. In addition, because a most appropriate image processing is carried out to limited documents, image quality can be improved.

The document type automatic discrimination section may, based upon plural types of parameters that are extracted from the input image data and which parameters are used for discriminating a document type, discriminate at least a printed-picture document constituted of a halftone reproduction region and a photographic-picture document constituted of a continuous tone region.

In this case, many of inkjet printed images can be finely reproduced in a (text) printed-picture mode or in a (text) photographic-picture mode. Therefore, by limitedly discriminating only inkjet printed images that cannot be finely reproduced in these two modes, accuracy of discrimination can be improved.

The document type automatic discrimination section may include: a halftone pixel quantity counting section that counts a quantity of pixels in the input image data that belong to the halftone reproduction region; and a high density pixel counting section that counts a quantity of pixels in the input image data whose density value is within a predetermined density region, and further, a result of counting by the halftone pixel quantity counting section and a result of counting by the high density pixel counting section may be assigned to the plural types of parameters used for discriminating the document type, and based upon the parameters, a specific inkjet printed image may be discriminated.

An inkjet printed image constituted of a low density region and a high density region is an exemplar of inkjet printed images that cannot be finely reproduced in a conventional image mode (process for printed-picture documents, process for photographic-picture documents). In this case, by discriminating an inkjet printed image based upon a proportion of a quantity of (halftone) pixels containing an area coverage modulation and a quantity of high density pixels to the entire image, it becomes possible to discriminate only inkjet printed images that cannot be finely reproduced in a conventional document mode, thereby improving image quality.

A pixel belonging to the halftone reproduction region includes a pixel belonging to an image in which halftone is produced with binary or multi-level changes of areas, such as a pixel belonging to an image constituted of halftones, a pixel belonging to a line screen halftone image constituted of digestedly and thickly lined-up parallel lines, a pixel belonging to an image created with error diffusion method, a pixel belonging to an image created with the bi-level representation method adaptive to gray level structures in a mesh, a pixel belonging to an image created with the bi-level display technique using the division of density in display regions, a pixel belonging to an image created with the dither method, or a pixel belonging to an image created with the density pattern method. For convenience, the pixel belonging to the halftone reproduction region is referred to as a halftone pixel. The same applies to a halftone pixel counting step and a halftone pixel counting procedure.

The document type automatic discrimination section may further include a photographic-paper pixel quantity counting section that counts a quantity of pixels in the input image data that belong to the continuous tone region, and the specific inkjet printed image may be discriminated based upon a result of counting by the halftone pixel quantity counting section, a result of counting by the photographic-paper pixel quantity counting section, and a result of counting by the high density pixel counting section.

In this case, by taking a quantity of pixels of the photographic-picture into consideration, a probability of discriminating specific inkjet printed images can be improved.

The document type automatic discrimination section may further include: a halftone pixel quantity counting section that counts a quantity of pixels in the input image data that belong to the halftone reproduction region; and a halftone frequency range determination section that determines a range of halftone frequencies in the input image data as a parameter indicating a deviation of a distance between dots in the document, and further, a result of counting by the halftone pixel quantity counting section and a result of determination by the halftone frequency range determination section may be assigned to the plural types of parameters used for discriminating a document type, and based upon the parameters, a specific inkjet printed image may be discriminated.

In this case, by discriminating an inkjet printed image based upon a quantity of pixels (of halftones) including an area coverage modulation and a width of distribution (range) of halftone frequencies of halftone pixels (range of histogram of halftone frequencies (pixel transition number) of halftone pixels), it becomes possible to discriminate only inkjet printed images that cannot be finely reproduced in a conventional document mode, thereby improving image quality.

The document type automatic discrimination section may further include a photographic-paper pixel quantity counting section that counts a quantity of pixels in the input image data that belong to the continuous tone region, and a specific inkjet printed image may be discriminated based upon a result of counting by the halftone pixel quantity counting section, a result of counting by the photographic-paper pixel quantity counting section, and a result of determination by the halftone frequency range determination section.

In this case, by taking a quantity of pixels of photographic-picture into consideration, a probability of discriminating specific inkjet printed images can be improved.

The document type automatic discrimination section may include: a halftone pixel quantity counting section that counts a quantity of pixels in the input image data that belong to the halftone reproduction region; a high density pixel counting section that counts a quantity of pixels in the input image data whose density value is within a predetermined range; and a halftone frequency range determination section that determines a range of halftone frequencies in the input image data as a parameter indicating a deviation of a distance between dots in the document, and further, a result of counting by the halftone pixel quantity counting section, a result of counting by the high density pixel counting section, and a result of determination by the halftone frequency range determination section may be assigned to the plural types of parameters used for discriminating a document type, and based upon the parameters, a specific inkjet printed image may be discriminated.

In this case, because both a quantity of high density pixels and a halftone frequency are used as parameters for discriminating a specific inkjet printed image, it becomes possible to more accurately discriminate a specific inkjet printed image.

The document type automatic discrimination section may further include a photographic-paper pixel quantity counting section that counts a quantity of pixels in the input image data that belong to the continuous tone region, and a specific inkjet printed image may be discriminated based upon a result of counting by the halftone pixel quantity counting section, a result of counting by the high density pixel counting section, a result of counting by the photographic-paper pixel quantity counting section, and a result of determination by the halftone frequency range determination section.

In this case, by taking a quantity of pixels of the photographic-picture into consideration, a probability of discriminating specific inkjet printed images can be improved.

It is preferable that an image forming apparatus in the present invention include an image processing apparatus structured as described above.

In this case, because a document having peculiar characteristics of inkjet that cannot be finely reproduced in a conventional document mode, such as a printed-picture or a photographic-picture, can be discriminated, and a most appropriate process can be carried out, an image forming apparatus that can output a high quality image can be provided.

Further, a program of the present invention is a document type automatic discrimination program causing, based upon image data read from a document, a computer to execute a process of automatically discriminating a document type of the document, characterized in that the program causes a computer to execute procedures of: extracting plural types of characteristics from the input image data; obtaining, based upon the extracted characteristics, plural types of parameters used for discriminating a document type; and discriminating, based upon the obtained parameters, a specific inkjet printed image whose output image data would not reach a standard level, if a process for a halftone reproduction region or a process for a continuous tone region were to be carried out on the input image data.

The program may cause a computer to execute: a halftone pixel quantity counting procedure of counting a quantity of pixels in the input image data that belong to the halftone reproduction region; a high density pixel quantity counting procedure of counting a quantity of pixels in the input image data whose density value is within a predetermined range; and a procedure whereby a result of counting carried out in the halftone pixel quantity counting procedure and a result of counting carried out in the high density pixel counting procedure are assigned to the plural types of parameters used for discriminating the document type, and based upon the parameters, a specific inkjet printed image is discriminated.

Further, the program may further cause a computer to execute: a halftone pixel quantity counting procedure of counting a quantity of pixels in the input image data that belong to the halftone reproduction region; a high density pixel counting procedure of counting a quantity of pixels in the input image data whose density value is within a predetermined range; a halftone frequency range determination procedure of determining a range of halftone frequencies in the input image data as a parameter indicating a deviation of a distance between dots in the document; and a procedure whereby a result of counting carried out in the halftone pixel quantity counting procedure, a result of counting carried out in the high density pixel counting procedure, and a result of determination carried out in the halftone frequency range determination procedure are assigned to the plural types of parameters, and based upon the parameters, a specific inkjet printed image is discriminated.

Further, the program may further cause a computer to execute: a halftone pixel quantity counting procedure of counting a quantity of pixels in the input image data that belong to the halftone reproduction region; a high density pixel counting procedure of counting a quantity of pixels in the input image data whose density value is within a predetermined range; a halftone frequency range determination procedure of determining a range of halftone frequencies in the input image data as a parameter indicating a deviation of a distance between dots in the document; and a procedure whereby a result of counting carried out in the halftone pixel quantity counting procedure, a result of counting carried out in the high density pixel counting procedure, and a result of determination carried out in the halftone frequency range determination procedure are assigned to the plural types of parameters, and based upon the parameters, a specific inkjet printed image is discriminated.

As described above, because the steps in the method for processing an image can be executed with a computer, a general purpose computer can be used. Further, it becomes possible to use the computer as the image processing apparatus.

The programs described above may be stored in a computer-readable recording medium.

In this case, with a program read from the recording medium, the image processing apparatus described above can be realized on the computer.

The present invention may be one in which the above-described image processing method that discriminates a document type is stored as a program in a computer-readable recording medium storing a program for causing a computer to execute. This can provide a mobile recording medium storing a program carrying out the image processing method that discriminates a document type.

In the embodiment, as the recording medium, a memory (the memory is not illustrated because a process is carried out by a microcomputer), for example a ROM, may be a program medium. Further, a program reading apparatus (not illustrated) may be set up as an external storing apparatus, and insertion of a recording medium therein may allow the program media to be computer-readable.

For any case, a stored program may be structured in such a way that a microprocessor accesses and executes the program. Further, for any case, a program may be read, and the read program may be downloaded into a program storing region (not illustrated) in the microcomputer, and may be executed. The program for downloading is precedently stored in the main apparatus.

The program medium is separable from the main apparatus, and may be a medium fixedly keeping a program. Examples of such a medium includes: tapes such as an electromagnetic tape or a tape cassette; disks such as a magnetic disk (for example, floppy disk and hard disk) or an optical disk (for example, CD-ROM, MO, MD, and DVD); cards such as an IC card (including memory cards) or an optical card; or semiconductor memories such as a mask ROM, an EPROM (Erasable Programmable Read Only Memory), an EEPROM (Electrically Erasable Programmable Read Only Memory), or a flash ROM.

Further, in Embodiment, because the system is structured in such a way that communications networks including the Internet can be connected, the medium may keep a program in flux in such a way as to download a program from the communications networks. In a case in which the program is downloaded from the communications networks, the program to be downloaded may be precedently stored in the main apparatus or installed from other recording media.

The recording medium is read by a program reading apparatus included in a digital color image forming apparatus or a computer system, so that the above-described method for processing an image is executed.

The computer system is formed of: an image input apparatus, such as a flatbed scanner, a film scanner, or a digital camera; a computer in which various processes, including the method for processing an image described above, when a predetermined program is loaded; an image displaying apparatus, such as CRT displays or liquid crystal displays, that displays a result of a process carried out by the computer; and a printer that outputs the result of the process carried out by the computer on, for example, papers. Further, a network card or modem, both of which function as a communication section for accessing, for example, a server through networks is mounted.

The present invention is not limited to the description of the embodiments above, but may be altered by a skilled person within the scope of the claims. An embodiment based on a proper combination of technical means disclosed in different embodiments is encompassed in the technical scope of the present invention.

An image processing apparatus described in the embodiments is applicable to an apparatus that needs to discriminate a document type, such as color-copying machines, flatbed scanners, film scanners, or digital cameras.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. An image processing apparatus, comprising:
a document type automatic discrimination section that, based upon image data read from a document, automatically discriminates a document type of the document, wherein the document type automatic discrimination section comprises:
a halftone pixel quantity counting section that counts a halftone pixel quantity which is a quantity of pixels in the image data that belong to a halftone reproduction region;
a photographic-picture pixel quantity counting section that counts a photographic-picture pixel quantity which is a quantity of pixels in the image data that belong to a continuous tone region; and
a high density pixel counting section that counts a high-density pixel quantity which is a quantity of pixels in the image data, such that in each of the pixels any one color component takes on a value smaller than a predetermined threshold,
wherein with reference to a counting result yielded by the halftone pixel quantity counting section, a counting result yielded by the photographic-picture pixel quantity counting section, and a counting result yielded by the high density pixel counting section, the document is discriminated as a specific inkjet printed image when TH1<the halftone pixel quantity, TH3<the photographic-picture pixel quantity, and TH4<the high-density pixel quantity are satisfied,
TH1 being a threshold for determining whether or not the document is a photographic-picture document and indicating a minimum quantity of counted halftone pixels at which the document is not determined as a photographic-picture document, TH3 being a threshold for determining whether or not the document is a printed-picture document and indicating a minimum quantity of counted photographic-picture pixels at which the document is not determined as a printed-picture document, and TH4 indicating a maximum quantity of high-density pixels at which no deterioration in image quality is observed when a toner distortion occurs.

2. An image processing apparatus, comprising:

a document type automatic discrimination section that, based upon image data read from a document, automatically discriminates a document type of the document, wherein the document type automatic discrimination section comprises:

a halftone pixel quantity counting section that counts a halftone pixel quantity which is a quantity of pixels in the image data that belong to a halftone reproduction region;

a photographic-picture pixel quantity counting section that counts a photographic-picture pixel quantity which is a quantity of pixels in the image data that belong to a continuous tone region; and a halftone frequency range determination section that determines, as a parameter indicating a deviation of a distance between dots in the document, a range of halftone frequencies in the image data, wherein with reference to a counting result yielded by the halftone pixel quantity counting section, a counting result yielded by the photographic-picture pixel quantity counting section, and a determination result yielded by the halftone frequency range determination section, the document is discriminated as a specific inkjet printed image when TH21<the halftone pixel quantity, TH22<the photographic-picture pixel quantity, and TH23<the range of halftone frequencies are satisfied, TH21 being a threshold for determining whether or not the document is a photographic-picture document and indicating a minimum quantity of counted halftone pixels at which the document is not determined as a photographic-picture document, TH22 being a threshold for determining whether or not the document is a printed-picture document and indicating a minimum quantity of counted photographic-picture pixels at which the document is not determined as a printed-picture document, and TH23 indicating a maximum range of halftone frequencies in the printed-picture document.

3. An image processing apparatus, comprising:

a document type automatic discrimination section that, based upon image data read from a document, automatically discriminates a document type of the document, wherein the document type automatic discrimination section comprises:

a halftone pixel quantity counting section that counts a halftone pixel quantity which is a quantity of pixels in the image data that belong to a halftone reproduction region;

a photographic-picture pixel quantity counting section that counts a photographic-picture pixel quantity which is a quantity of pixels in the image data that belong to a continuous tone region;

a high density pixel counting section that counts a high-density pixel quantity which is a quantity of pixels in the image data, such that in each of the pixels any one color component takes on a value smaller than a predetermined threshold; and a halftone frequency range determination section that determines, as a parameter indicating a deviation of a distance between dots in the document, a range of halftone frequencies in the image data, wherein with reference to a counting result yielded by the halftone pixel quantity counting section, a counting result yielded by the photographic-picture pixel quantity counting section, a counting result yielded by the high density pixel counting section, and a determination result yielded by the halftone frequency range determination section, the document is discriminated as a specific inkjet printed image when TH31<the halftone pixel quantity, TH32<the photographic-picture pixel quantity, TH33<the high-density pixel quantity, and TH34<the range of halftone frequencies are satisfied, TH31 being a threshold for determining whether or not the document is a photographic- picture document and indicating a minimum quantity of counted halftone pixels at which the document is not determined as a photographic-picture document, TH32 being a threshold for determining whether or not the document is a printed-picture document and indicating a minimum quantity of counted photographic-picture pixels at which the document is not determined as a printed-picture document, TH33 indicating a maximum quantity of high-density pixels at which no deterioration of image quality is observed when a toner distortion occurs, and TH34 indicating a maximum range of halftone frequencies in the printed-picture document.

* * * * *